(12) United States Patent
Saito et al.

(10) Patent No.: US 11,561,204 B2
(45) Date of Patent: Jan. 24, 2023

(54) DISPLAY CONTROL SYSTEM, INSPECTION CONTROL SYSTEM, DISPLAY CONTROL METHOD, AND STORAGE MEDIUM

(71) Applicant: KABUSHIKI KAISHA TOSHIBA, Minato-ku (JP)

(72) Inventors: Masahiro Saito, Yokohama (JP); Hiromasa Takahashi, Minato (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 156 days.

(21) Appl. No.: 17/002,986

(22) Filed: Aug. 26, 2020

(65) Prior Publication Data
US 2021/0063354 A1  Mar. 4, 2021

(30) Foreign Application Priority Data

Aug. 28, 2019  (JP) .............................. JP2019-155889
Aug. 14, 2020  (JP) .............................. JP2020-136900

(51) Int. Cl.
*G01N 29/06* (2006.01)
*G01N 29/22* (2006.01)
*G01N 29/265* (2006.01)

(52) U.S. Cl.
CPC ....... *G01N 29/226* (2013.01); *G01N 29/0618* (2013.01); *G01N 29/265* (2013.01); *G01N 2291/267* (2013.01)

(58) Field of Classification Search
CPC ..... G01N 2291/267; G01N 2291/2672; G01N 29/226; G01N 29/0618; G01N 29/265
See application file for complete search history.

(56) References Cited

U.S. PATENT DOCUMENTS 3,678,736 A    7/1972  May
2004/0019270 A1  1/2004  Takeuchi
(Continued)

FOREIGN PATENT DOCUMENTS

CA  3 072 737 A1  5/2019
JP  10-216955 A   8/1998
(Continued)

OTHER PUBLICATIONS

Xiao-li Han et al., Application of Ultrasonic Phased Array Total Focusing Method In Weld Inspection Using an Inclided Wedge, Oct. 1, 2014, IEEEXplore, pp. 114-117 (Year: 2014).*
(Continued)

*Primary Examiner* — Tam T Tran
(74) *Attorney, Agent, or Firm* — Oblon, McClelland, Maier & Neustadt, L.L.P.

(57) ABSTRACT

According to one embodiment, a display control system acquires a tilt of a detector with respect to a weld portion. The detector includes a plurality of detection elements arranged along a first arrangement direction and a second arrangement direction. The first arrangement direction and the second arrangement direction cross each other. The tilt is calculated based on a detection result of a reflected wave obtained by transmitting an ultrasonic wave from the plurality of detection elements. The system displays a user interface, displays a symbol and a tolerance range in a region included in the user interface, and updates the display of the symbol in the region according to the acquiring of the tilt. The region spreads two-dimensionally. The symbol indicates the tilt. The tolerance range is of a target value of the tilt.

21 Claims, 27 Drawing Sheets

(56) References Cited

U.S. PATENT DOCUMENTS

| | | |
|---|---|---|
| 2004/0245315 A1 | 12/2004 | Maev et al. |
| 2008/0210009 A1 | 9/2008 | Tanishiki |
| 2009/0178482 A1 | 7/2009 | Hough et al. |
| 2010/0031750 A1 | 2/2010 | Spencer et al. |
| 2011/0000299 A1 | 1/2011 | Isobe et al. |
| 2014/0042208 A1* | 2/2014 | Uchida ............... B23K 31/125 228/103 |
| 2014/0357994 A1* | 12/2014 | Jin ....................... A61B 8/429 600/438 |
| 2016/0320344 A1 | 11/2016 | Spencer et al. |
| 2018/0143164 A1* | 5/2018 | Rousseau ........... G01N 29/4481 |
| 2018/0259489 A1* | 9/2018 | Bruch ................. G01N 29/225 |
| 2020/0003735 A1 | 1/2020 | Ushijima et al. |
| 2020/0018727 A1 | 1/2020 | Ono et al. |
| 2020/0363377 A1 | 11/2020 | Saito et al. |

FOREIGN PATENT DOCUMENTS

| | | |
|---|---|---|
| JP | 2003-322646 A | 11/2003 |
| JP | 2006-220608 A | 8/2006 |
| JP | 2007-278809 A | 10/2007 |
| JP | 2008-51645 A | 3/2008 |
| JP | 2009-204327 A | 9/2009 |
| JP | 2011-203126 A | 10/2011 |
| JP | 2012-247262 A | 12/2012 |
| JP | 2012-251842 A | 12/2012 |
| JP | 3189500 U | 3/2014 |
| JP | 2016-168142 A | 9/2016 |
| JP | 2017-142212 A | 8/2017 |
| JP | 2018-513976 A | 5/2018 |
| JP | 2019-90727 A | 6/2019 |
| JP | 6629393 B1 | 1/2020 |
| JP | 2020-187005 | 11/2020 |
| WO | WO 2016/164457 A1 | 10/2016 |
| WO | WO 2018/105366 A1 | 6/2018 |
| WO | WO 2019/098232 A1 | 5/2019 |

OTHER PUBLICATIONS

Jian Li et al., Research on Ultrasonic Phased Array System for Automatic Defect Detection of Pipeline Girth Welds, Aug. 1, 2009, IEEE Xplore, pp. 903-907 (Year: 2009).*

Ushijima, A. et al., "Spot Welding Inspection Robot Achieving Labor Saving and Improvement of Reliability Using 3D Ultrasonic Inspection Equipment," TOSHIBA Review, vol. 74, No. 4, 2019, 9 pages (with English Abstract and English Machine translation).

Matsumura, M. et al., "Image Recognition Techniques Enabling Precise Understanding for Robots," TOSHIBA Review, vol. 74, No. 4, 2019, 6 pages (with English Abstract and partial English Machine translation).

* cited by examiner

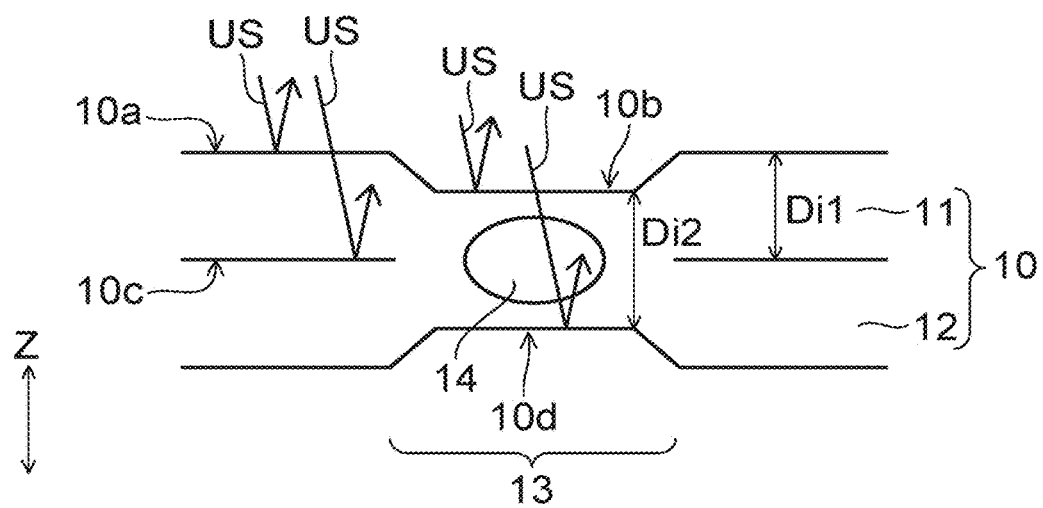
FIG. 12A
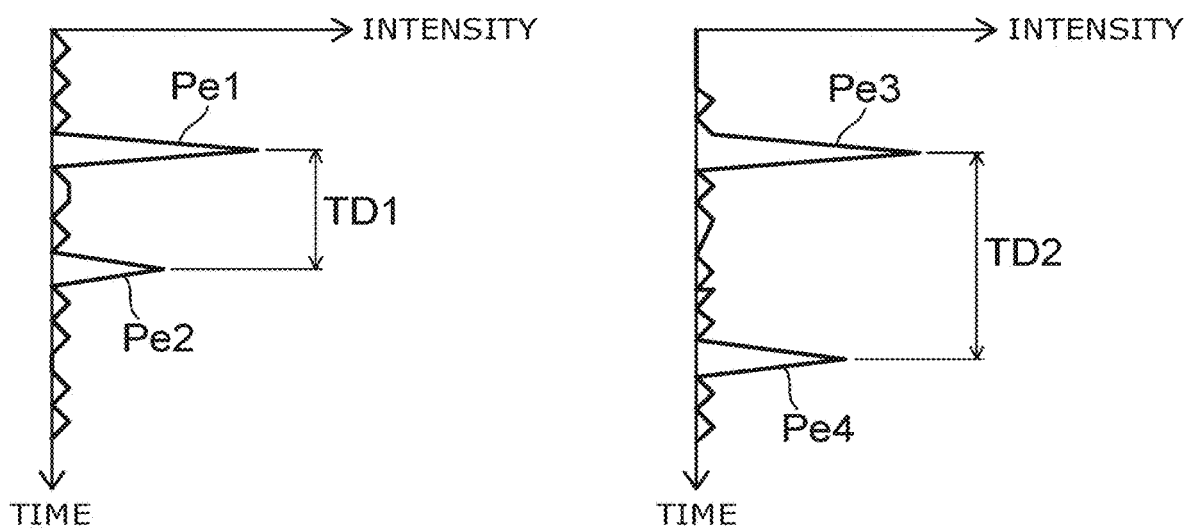
FIG. 12B
FIG. 12C

DISPLAY CONTROL SYSTEM, INSPECTION CONTROL SYSTEM, DISPLAY CONTROL METHOD, AND STORAGE MEDIUM

CROSS-REFERENCE TO RELATED APPLICATIONS

This application is based upon and claims the benefit of priority from Japanese Patent Application No. 2019-155889, filed on Aug. 28, 2019; and Japanese Patent Application No. 2020-136900, filed on Aug. 14, 2020; the entire contents of which are incorporated herein by reference.

FIELD

Embodiments described herein relate generally to a display control system, an inspection control system, a display control method, and a storage medium.

BACKGROUND

In welding, portions of two or more members are joined to each other by melting. The welded members are inspected for whether or not the welded portion (hereinbelow, called the weld portion) is joined appropriately. For example, in a non-destructive inspection, a human (an inspector) that grips a probe causes the probe to contact the weld portion. An ultrasonic wave is transmitted from the probe toward the weld portion, and an inspection device verifies the existence or absence of the joint based on the reflected wave.

In the inspection, the tilt of the probe with respect to the weld portion affects the inspection result. Therefore, when inspecting, it is desirable for the inspector to be able to easily ascertain information relating to the inspection such as the tilt of the probe with respect to the weld portion, how the tilt should be changed, etc.

BRIEF DESCRIPTION OF THE DRAWINGS

FIGS. 12A to 12C are schematic views for describing the inspection method according to the inspection system according to the embodiment;

DETAILED DESCRIPTION

Figure 1:
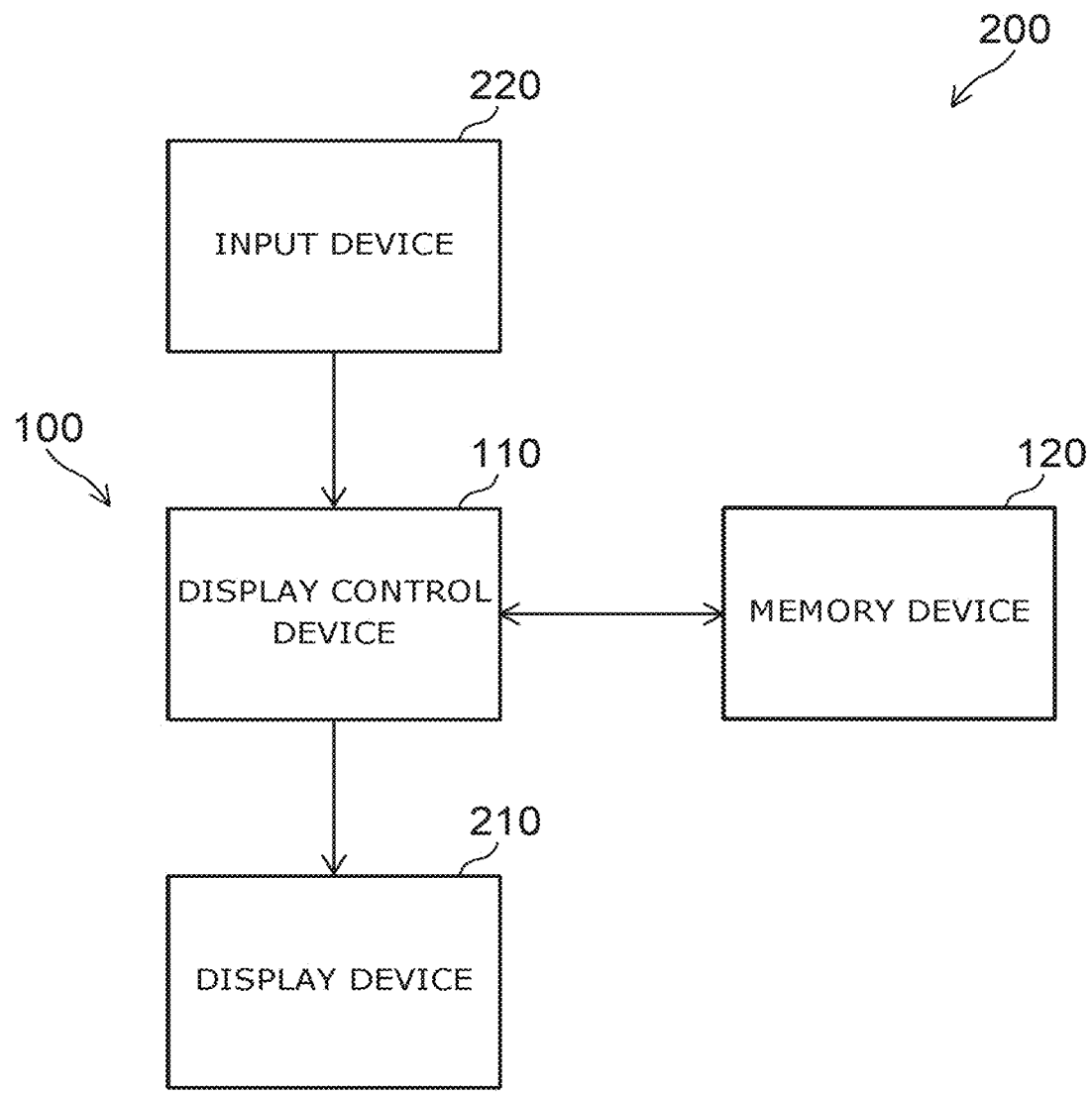
FIG. 1 is a block diagram illustrating a configuration of a display control system and a display system according to an embodiment.

According to one embodiment, a display control system acquires a tilt of a detector with respect to a weld portion. The detector includes a plurality of detection elements arranged along a first arrangement direction and a second arrangement direction. The first arrangement direction and the second arrangement direction cross each other. The tilt is calculated based on a detection result of a reflected wave obtained by transmitting an ultrasonic wave from the plurality of detection elements. The system displays a user interface, displays a symbol and a tolerance range in a region included in the user interface, and updates the display of the symbol in the region according to the acquiring of the tilt. The region spreads two-dimensionally. The symbol indicates the tilt. The tolerance range is of a target value of the tilt.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

FIG. 1 is a block diagram illustrating a configuration of a display control system and a display system according to an embodiment.

As illustrated in FIG. 1, the display control system 100 according to the embodiment includes a display control device 110 and a memory device 120. The memory device 120 stores data relating to the weld inspection. The display control device 110 displays the data relating to the weld inspection in a user interface.

The display system 200 according to the embodiment includes the display control system 100, a display device 210, and an input device 220. The display control device 110 causes the display device 210 to display the user interface. The user easily can confirm the data relating to the weld inspection via the user interface displayed by the display device 210. Also, the user can use the input device 220 to input data to the display control device 110 via the user interface.

Here, the weld inspection will be described in detail. A non-destructive inspection of the weld portion is performed in the weld inspection.

Figure 2:
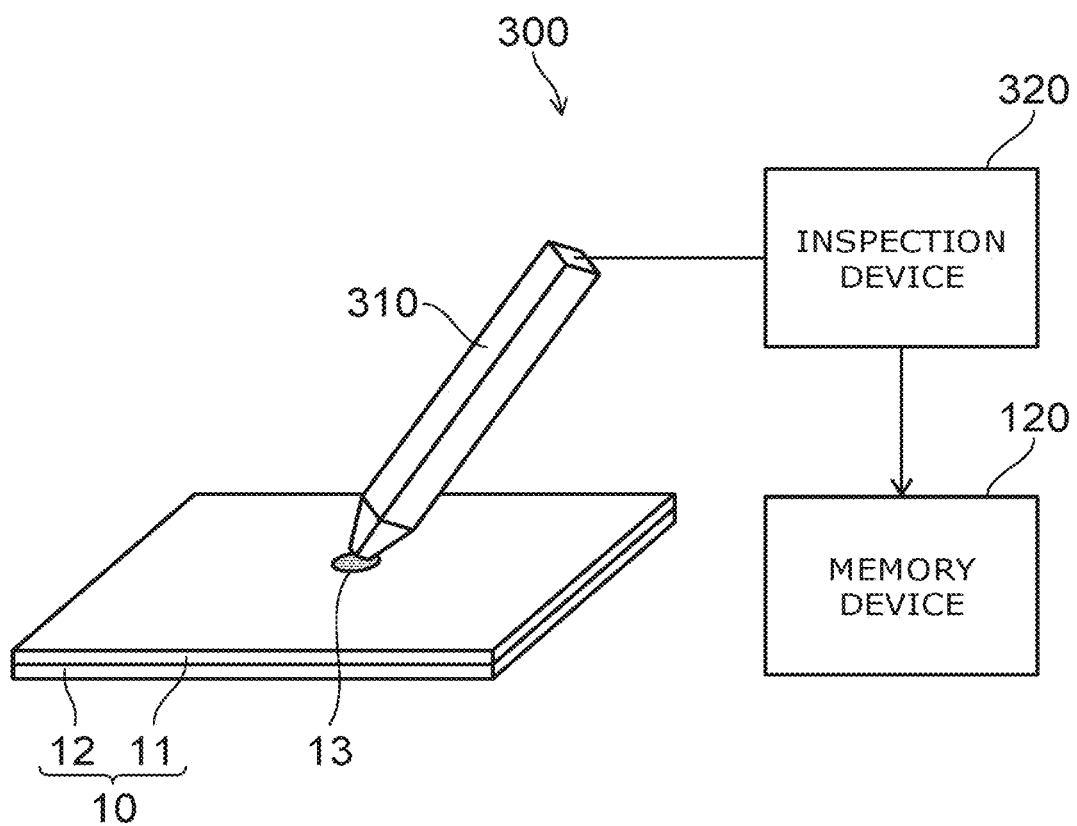
FIG. 2 is a schematic view illustrating a configuration of an inspection system according to the embodiment.

FIG. 2 is a schematic view illustrating a configuration of an inspection system according to the embodiment.

As illustrated in FIG. 2, the inspection system 300 according to the embodiment includes a detector having multiple detection elements.

The detector is, for example, a probe 310 having a stick-shaped that can be gripped by the hand of a human, as illustrated in FIG. 2. The detector includes the multiple detection elements for inspecting the weld portion. The human that grips the probe 310 inspects a weld portion 13 by causing the tip of the probe 310 to contact the weld portion 13. Hereinafter, the human (e.g., the inspector) that grips the probe 310 and performs the weld inspection is called the user.

Figure 3:
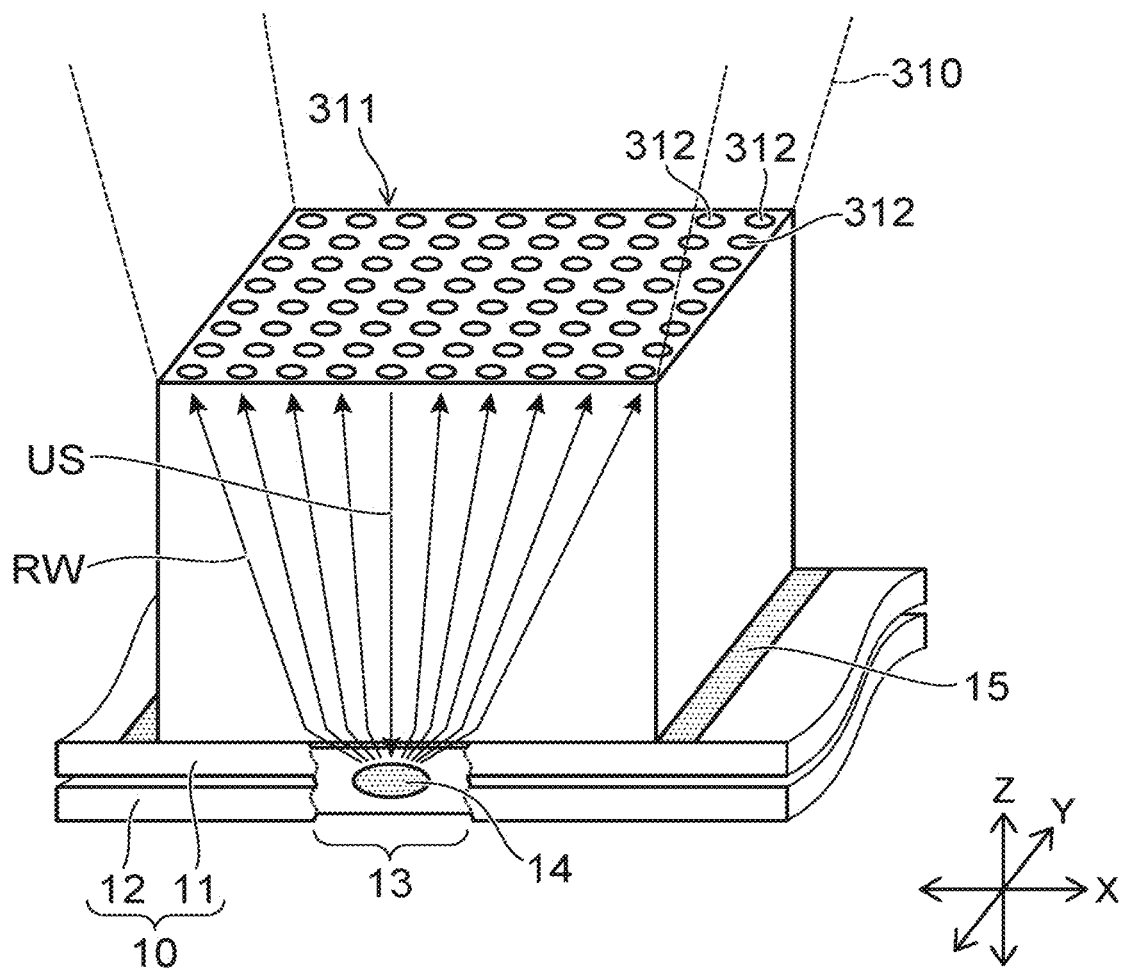
FIG. 3 is a schematic view illustrating the internal structure of the probe tip of the inspection system according to the embodiment.

FIG. 3 is a schematic view illustrating the internal structure of the probe tip of the inspection system according to the embodiment.

As illustrated in FIG. 3, a matrix sensor 311 is provided inside the probe 310 tip. The matrix sensor 311 includes the multiple detection elements. The detection element may be an ultrasonic sensor 312 capable of transmitting and receiving ultrasonic waves. The ultrasonic sensors 312 are, for example, transducers. The multiple ultrasonic sensors 312 are arranged along an X-direction (a first arrangement direction) and a Y-direction (a second arrangement direction) that cross each other. In the example, the X-direction and the Y-direction are orthogonal to each other. The X-direction and the Y-direction may not be orthogonal.

FIG. 2 and FIG. 3 illustrate a state of inspecting a member 10. The member 10 is made by spot-welding a metal plate 11 (a first member) and a metal plate 12 (a second member) at the weld portion 13. As illustrated in FIG. 3, a solidified portion 14 is formed at the weld portion 13 by a portion of the metal plate 11 and a portion of the metal plate 12 melting, mixing, and solidifying.

A couplant 15 is coated onto the surface of an inspection object when inspecting so that an ultrasonic wave propagates easily between the inspection object and the probe 310. Each of the ultrasonic sensors 312 transmits an ultrasonic wave US toward the member 10 coated with the couplant 15 and receives reflected waves RW from the member 10.

As one specific example as illustrated in FIG. 3, one ultrasonic sensor 312 transmits the ultrasonic wave US toward the weld portion 13. A portion of the ultrasonic wave US is reflected by the upper surface or the lower surface of the member 10, etc. Each of the multiple ultrasonic sensors 312 receives (detects) the reflected waves RW. The ultrasonic sensors 312 sequentially transmit the ultrasonic wave US, and the reflected waves RW are received by the multiple ultrasonic sensors 312.

The inspection device 320 calculates the tilt of the probe 310 with respect to the weld portion 13 by using the detection result of the obtained reflected waves and inspects the weld portion 13. Here, the angle between the normal direction of the surface of the weld portion 13 and the direction of the probe 310 is called the tilt. For example, the direction of the probe 310 corresponds to a Z-direction that is perpendicular to the arrangement direction of the ultrasonic sensors 312. The tilt is zero when the probe 310 contacts the weld portion 13 perpendicularly.

The inspection device 320 stores the calculation result of the tilt and the inspection result of the weld portion 13 in the memory device 120. The display control device 110 refers to the calculation result of the tilt stored in the memory device 120. Or, the inspection device 320 may transmit the calculation result of the tilt and the inspection result of the weld portion 13 to the display control device 110. An example will now be described in which the calculation result of the tilt and the inspection result are transmitted directly from the inspection device 320 to the display control device 110.

The inspection device 320 is connected to the probe 310 and the display control device 110 via wired communication, wireless communication, or a network. One processing device may function as the display control device 110 and the inspection device 320.

Figure 4:
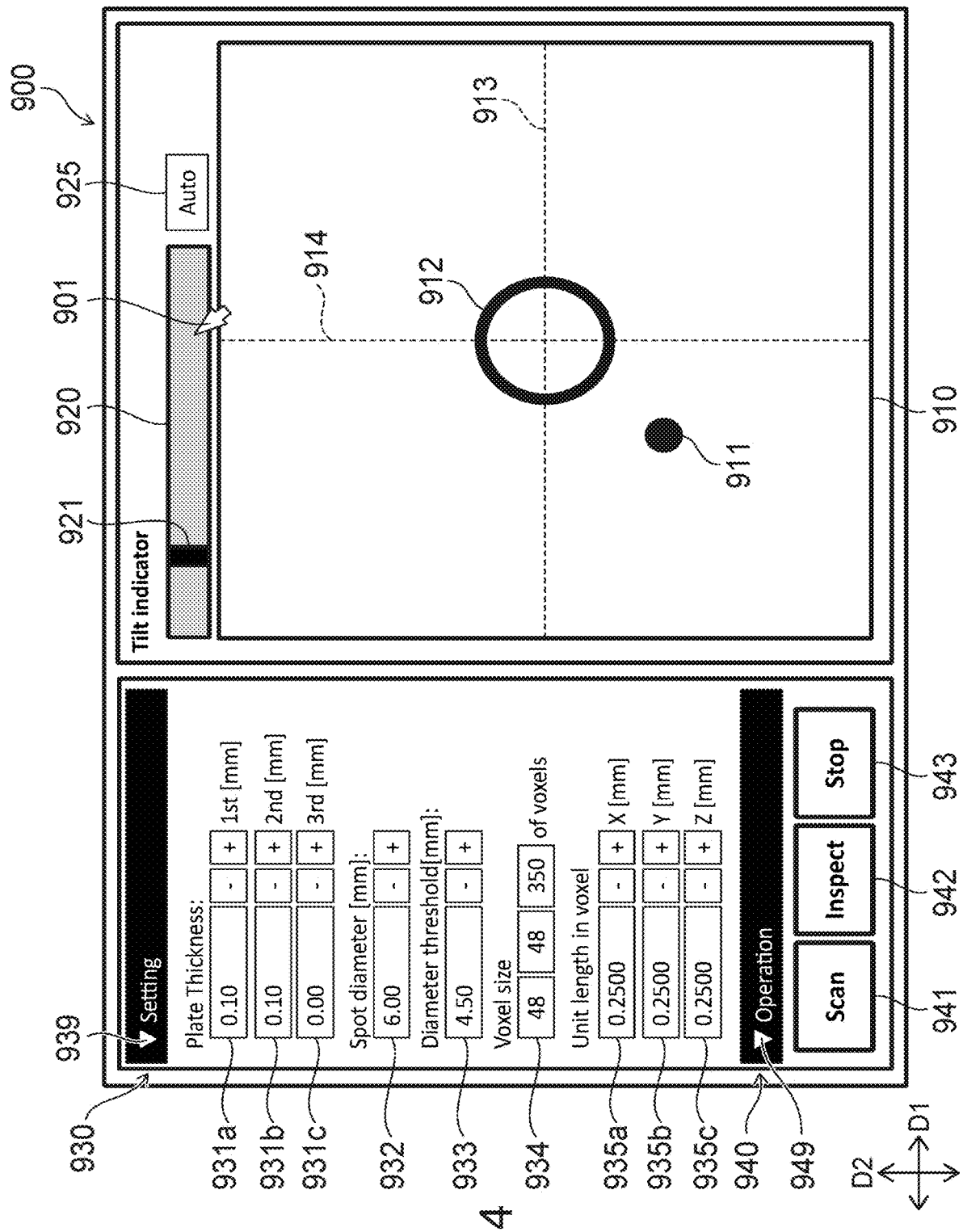
FIG. 4 is an example of the user interface displayed by the display control system according to the embodiment.

FIG. 4 is an example of the user interface displayed by the display control system according to the embodiment.

Figure 5:
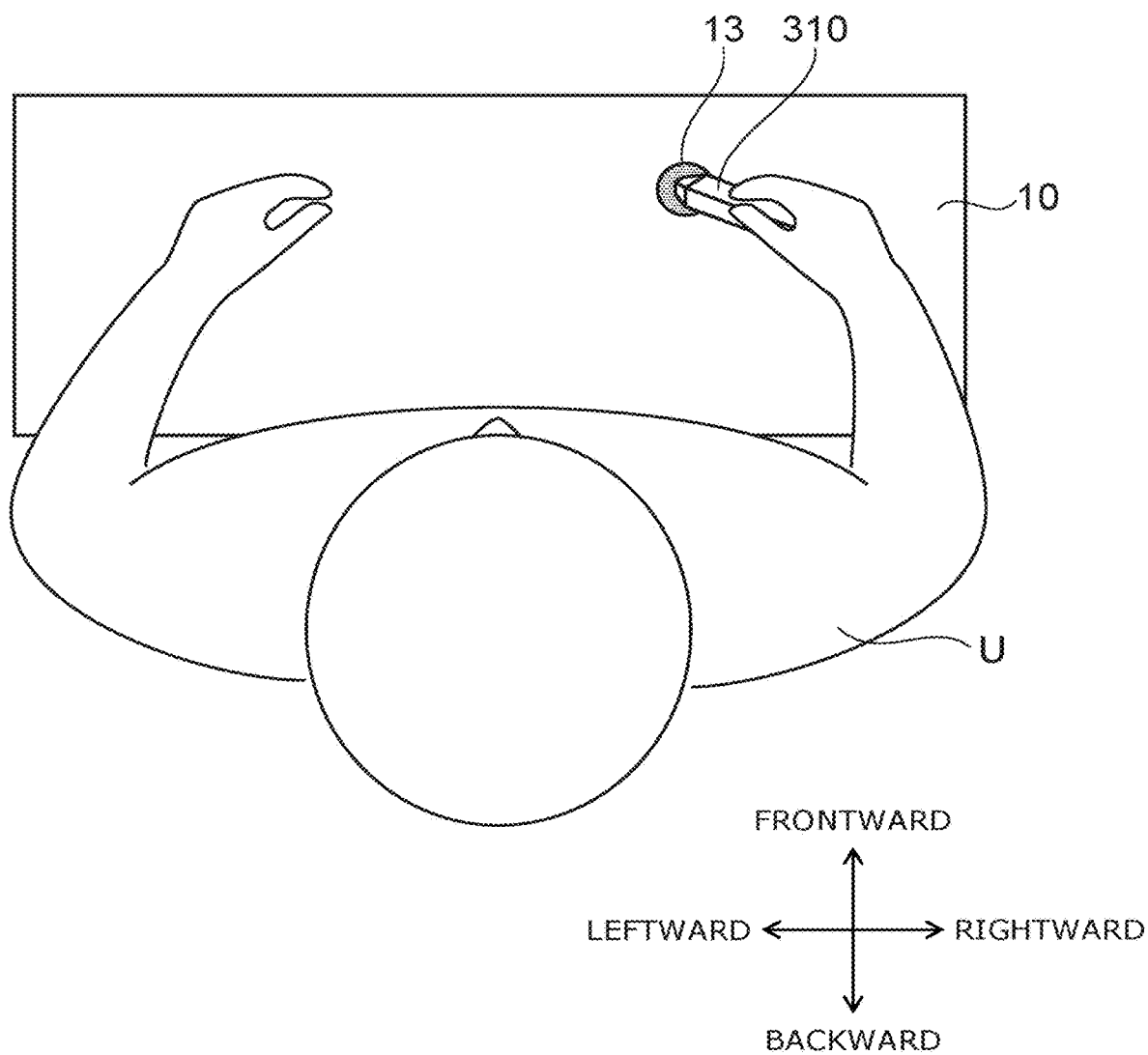
FIG. 5 is a schematic view illustrating a state of the weld inspection.

FIG. 5 is a schematic view illustrating a state of the weld inspection.

FIG. 6A to FIG. 8C are drawings for describing the processing according to the display control system according to the embodiment.

Figure 9A:
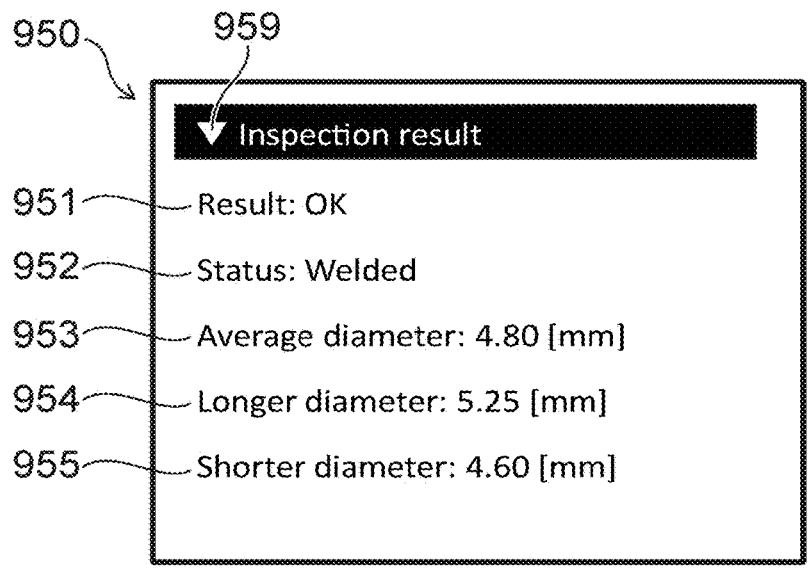
FIGS. 9A and 9B are examples of user interfaces displayed by the display control system according to the embodiment.
Figure 9B:
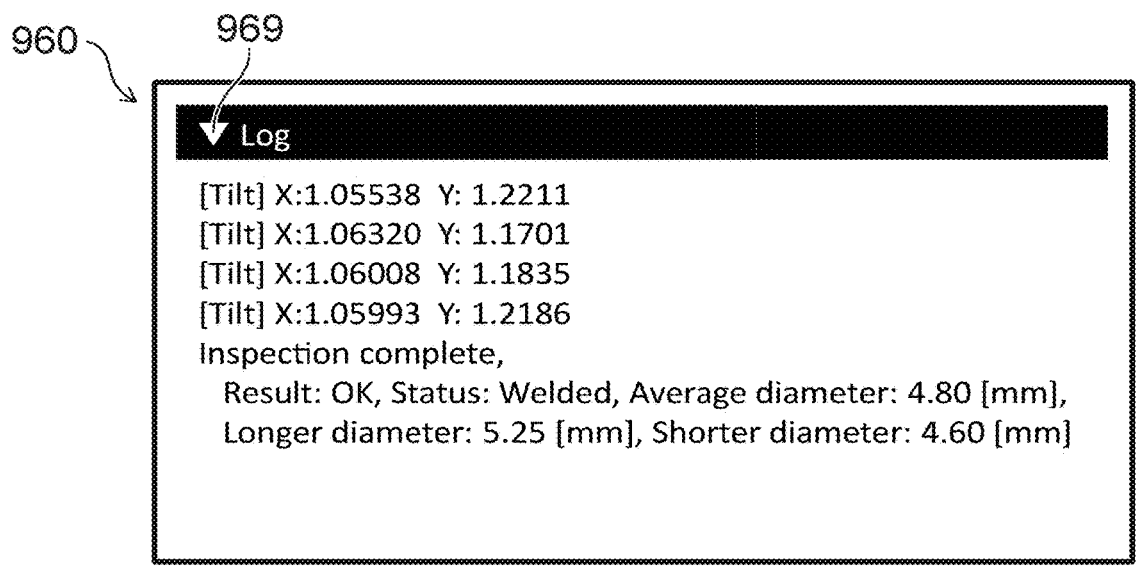

FIGS. 9A and 9B are examples of user interfaces displayed by the display control system according to the embodiment.

The display control device 110 displays information corresponding to the data stored in the memory device 120 and the data transmitted from the inspection device 320 in the user interface. For example, as illustrated in FIG. 4, a user interface 900 includes a region 910.

The region 910 is a display region spreading two-dimensionally. A symbol 911 and a tolerance range 912 are displayed in the region 910. The position of the symbol 911 in the region 910 indicates the tilt of the probe 310. Specifically, the position in some one direction in the region 910 indicates an angle of the probe 310 around the X-direction with respect to the weld portion 13. The position in another one direction in the region 910 indicates the angle around the Y-direction of the probe 310 with respect to the weld portion 13.

For example, a first direction D1 and a second direction D2 that are orthogonal to each other spread in the region 910. In the example of FIG. 4, the first direction D1 is the lateral direction, and the second direction D2 is the vertical direction. In the description hereinafter, the first direction D1 is taken to be the lateral direction, and the second direction D2 is taken to be the vertical direction. For example, the position in the lateral direction of the symbol 911 indicates the angle around the Y-direction of the probe 310 with respect to the weld portion 13. The position in the vertical direction of the symbol 911 indicates the angle around the X-direction of the probe 310 with respect to the weld portion 13.

The display control device 110 updates the display of the symbol 911 in the region 910 according to the reception of a new calculation result of the tilt. For example, the display control device 110 updates the display of the symbol 911 in the region 910 each time a new calculation result of the tilt is received. The tolerance range 912 indicates the range of the tolerated error for the target value of the tilt. The size of the tolerance range 912 is determined so that an appropriate inspection result is obtained when the symbol 911 is within the tolerance range 912.

The tolerance range is shown using a shape. In the example of FIG. 4, the tolerance range is shown using a circle. The shape that indicates the tolerance range is modified as appropriate. For example, the shape of the tolerance range may be elliptical or quadrilateral. The tolerance range may be shown using a cluster of multiple points or a cluster of multiple lines. The user that grips the probe 310 uses the display of the region 910 as a reference to adjust the tilt of the probe 310 so that the symbol 911 is within the tolerance range 912.

By displaying the user interface 900 in which the tilt of the probe 310 and the tolerance range of the tilt are shown, the user easily can ascertain the information relating to the weld inspection. In other words, according to the display control system 100 according to the embodiment, the information that relates to the weld inspection can be displayed to the user in a more easily understandable way.

A first axis 913 and a second axis 914 also are displayed in the example of FIG. 4. The first axis 913 is parallel to the first direction D1 (the lateral direction). The second axis 914 is parallel to the second direction D2 (the vertical direction). The first axis 913 is positioned at the vertical-direction center of the region 910. The second axis 914 is positioned at the lateral-direction center of the region 910. The crossing point of the first axis 913 and the second axis 914 indicates the target value of the tilt. In other words, the tilt of the probe 310 is zero when the symbol 911 is positioned at the crossing point of the first axis 913 and the second axis 914. The center of the tolerance range 912 is positioned at the crossing point of the first axis 913 and the second axis 914.

When the tilt of the probe 310 is changed, it is favorable for the movement direction of the symbol 911 to be associated with the change direction of the tilt of the probe 310. For example, the symbol 911 moves in the lateral direction on the region 910 when the tilt of the probe 310 toward the lateral direction is changed in the state in which the movement direction of the symbol 911 is associated with the change direction of the tilt. The symbol 911 moves in the vertical direction on the region 910 when the tilt of the probe 310 is changed frontward or backward. A change of the tilt of the probe 310 toward the lateral direction means a change of the angle of the probe 310 around the longitudinal direction. Similarly, a change of the tilt of the probe 310 frontward or backward means a change of the angle of the probe 310 around the lateral direction. By associating the movement direction of the symbol 911 with the change direction of the tilt, the user can associate the display of the region 910 and the actual tilt of the probe 310 more intuitively. Based on the positional relationship between the symbol 911 and the tolerance range 912, it can be understood intuitively how the probe 310 should be tilted.

Figure 6A:
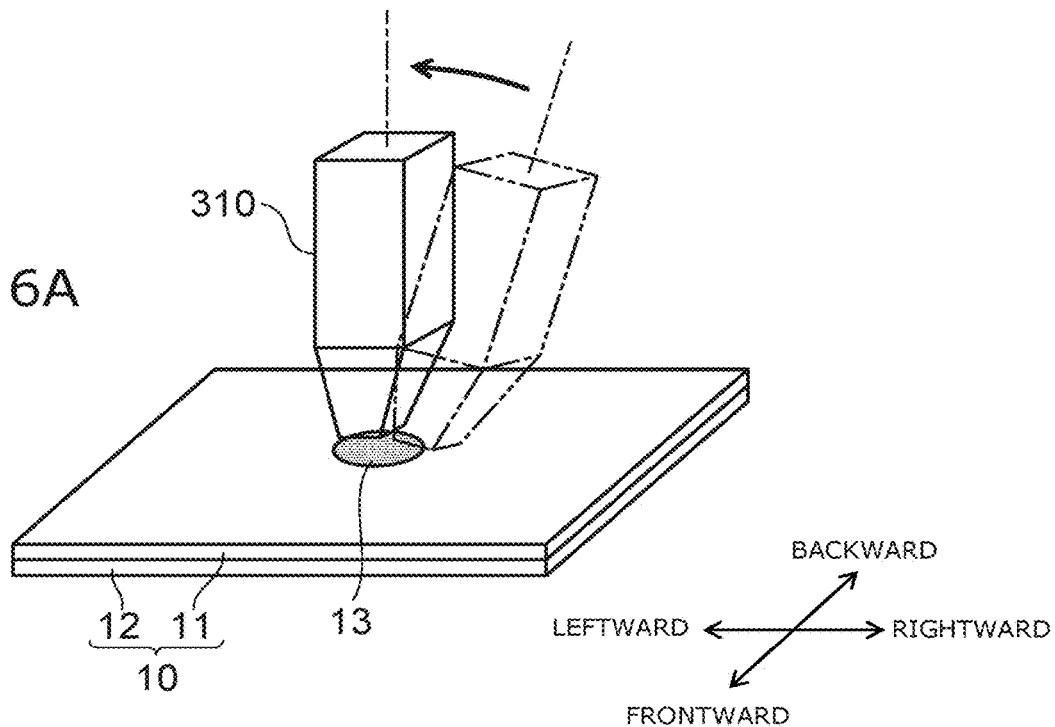
FIGS. 6A and 6B are drawings for describing the processing according to the display control system according to the embodiment.
Figure 6B:
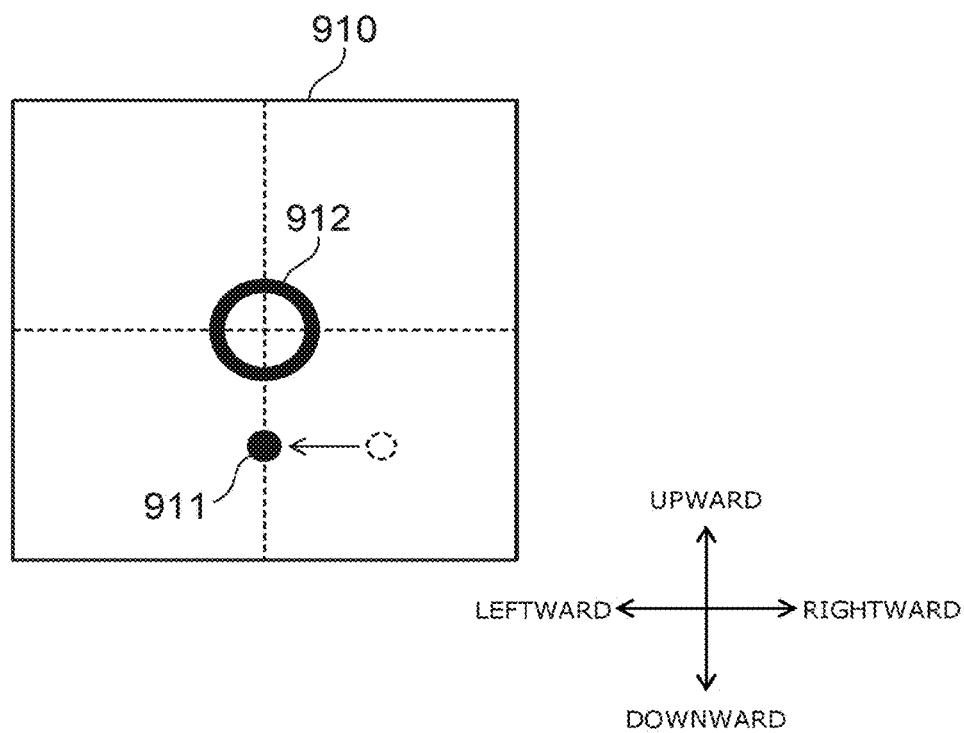

For example, a marker or the like for associating the movement direction of the symbol 911 and the change direction of the tilt is provided in the probe 310. By orienting the marker in a designated direction, the user U associates the arrangement direction of the ultrasonic sensors 312 and a direction when viewed by the user U. For example, the X-direction in which the ultrasonic sensors 312 are arranged is parallel to the lateral direction when viewed by the user U. When the association of these directions ends, the user U causes the probe 310 to contact the weld portion 13 as illustrated in FIG. 5. At this time, frontward, backward, leftward, rightward, upward, and downward when viewed by the user U are as illustrated in FIG. 5, FIG. 6A, and FIG. 6B. In this state, for example, the user U changes the tilt of the probe 310 leftward as illustrated in FIG. 6A. The tilt of the probe 310 after the change is calculated by the inspection device 320. Based on the newly calculated tilt, the display control device 110 updates the display of the symbol 911 in the region 910. At this time, the symbol 911 moves leftward on the region 910.

Similarly, the symbol 911 moves rightward when the user U changes the tilt of the probe 310 rightward. The symbol 911 moves upward when the user U changes the tilt of the probe 310 frontward. The symbol 911 moves downward when the user U changes the tilt of the probe 310 backward. Thus, by associating the direction of tilting the probe 310 and the movement direction of the symbol 911, the user U easily determines how the probe 310 should be tilted when referring to the region 910.

The display control device 110 may change the form of the display of the symbol 911 according to a first difference between the tilt of the probe 310 and the target value and a second difference between the tilt of the probe 310 and the tolerance range. For example, the display control device 110 displays the symbol 911 to flash. The display control device 110 changes the period of the flash of the symbol 911 according to the first difference or the second difference. For example, the display control device 110 shortens the period of the flash as the first difference or the second difference decreases. The display control device 110 may change the color of the symbol 911 as the first difference or the second difference decreases.

When the display control device 110 is connected to an acoustic device, the display control device 110 may cause the acoustic device to output a sound corresponding to the first difference or the second difference. For example, the display control device 110 causes the sound to be output discontinuously when displaying the symbol 911. The display control device 110 may shorten the period of the sound that is output as the first difference or the second difference decreases. The display control device 110 may change the timbre that is output as the first difference or the second difference decreases.

The display control device 110 may be configured to accept an operation of adjusting the size of the tolerance range 912. The user can set the size of the tolerance range 912 arbitrarily according to the precision necessary in the weld inspection. For example, the user uses the input device 220 to input an operation to the display control device 110. As illustrated in FIG. 4, an adjuster 920 for adjusting the size of the tolerance range 912 is displayed in the user interface 900. The adjuster 920 is illustrated using a slider. The user moves a pointer 901 onto a bar 921 inside the slider and uses the input device 220 to move the bar 921 by drag & drop.

Figure 7:
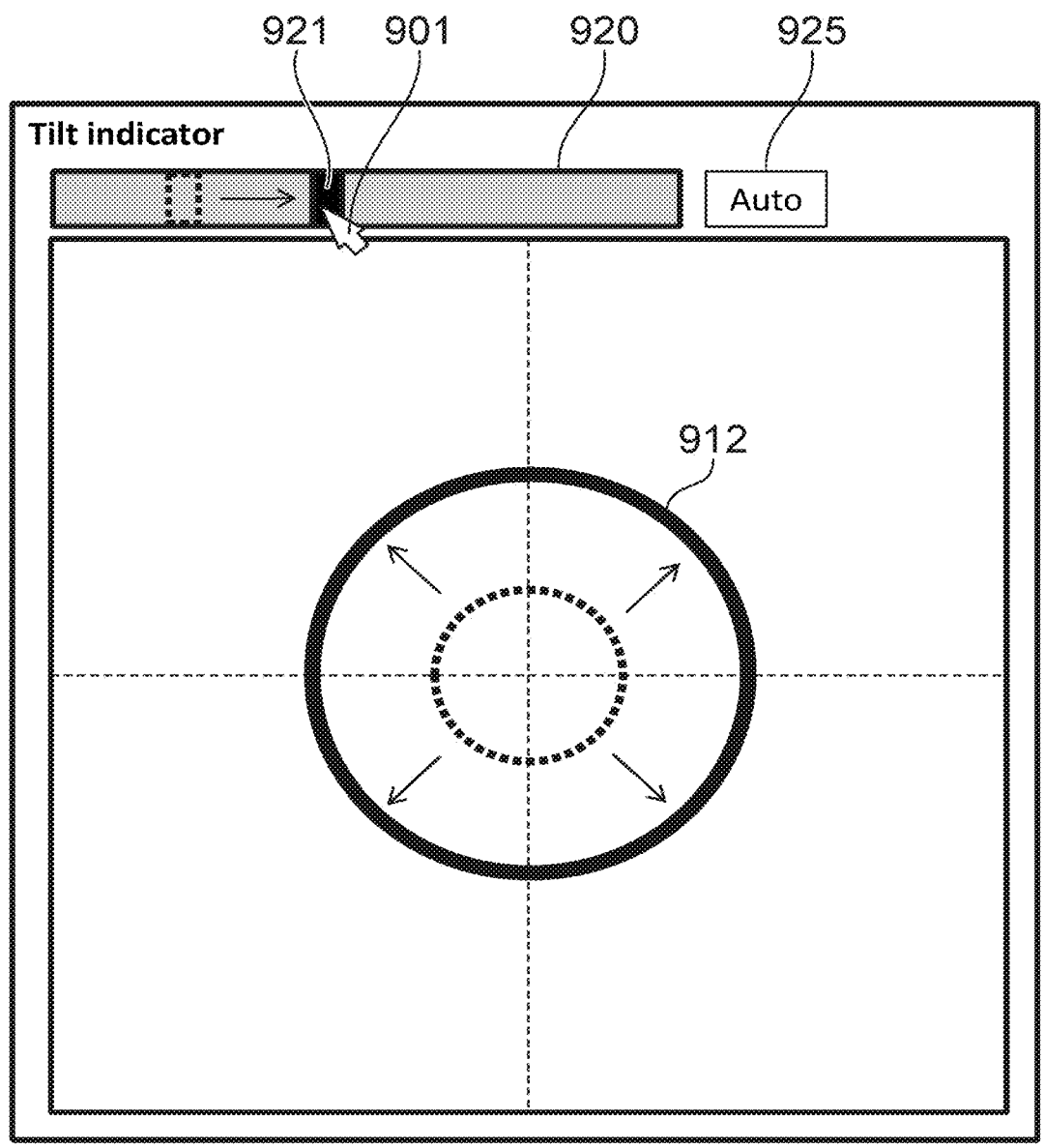
FIG. 7 is a drawing for describing the processing according to the display control system according to the embodiment.

For example, as illustrated in FIG. 7, the size of the tolerance range 912 changes according to the position of the bar 921.

An input field of a value indicating the tolerance range may be displayed as the adjuster 920. For example, the user can adjust the size of the tolerance range by inputting a value to the input field. Or, the user may be able to adjust the size of the tolerance range 912 displayed by the region 910 by using the pointer 901 to perform drag & drop of the tolerance range 912.

A switcher 925 for switching to an automatic adjustment of the tolerance range may be displayed in the user interface 900. In the example of FIG. 4, the switcher 925 is an icon. The switcher 925 may be a checkbox. The size of the tolerance range is adjusted automatically when the user clicks the switcher 925 by operating the pointer 901.

The size of the tolerance range is set based on a previous calculation result of the tilt and a previous inspection result stored in the memory device 120. The tilt of the probe 310 affects the inspection result of the weld portion 13. For example, the diameter of the weld portion 13 is calculated to be less than the actual value if the tilt of the probe 310 is too large. The diameter of the weld portion 13 that is calculated increases as the tilt of the probe 310 decreases. The diameter of the weld portion 13 that is calculated substantially no longer changes when the tilt of the probe 310 is sufficiently small. Such relationships between the tilt of the probe 310 and the diameter of the weld portion 13 that are calculated previously are stored in the memory device 120.

The display control device 110 determines a boundary value based on the data stored in the memory device 120 so that the change of the diameter of the weld portion 13 with respect to the change of the tilt of the probe 310 becomes small. The display control device 110 sets the size of the tolerance range based on the boundary value. For example, the display control device 110 sets the boundary value as the size of the tolerance range. Or, to increase the accuracy of the inspection, the display control device 110 may set, as the tolerance range, a value that is less than the value calculated based on the boundary value.

As illustrated in FIG. 4, a setter 930 and an operation part 940 also may be displayed in the user interface 900.

The user can use the setter 930 to set parameters relating to the weld inspection. Input fields 931a to 931c, 932, 933, 934, and 935a to 935c are displayed in the example of FIG. 4.

The thicknesses of the welded members are input to the input fields 931a to 931c. The diameter of the tip of the probe 310 is input to the input field 932. The threshold of the diameter of the weld portion 13 is input to the input field 933. For example, when inspecting a spot weld, the diameter of the weld portion 13 can be calculated based on the detection result of the reflected waves. The weld is determined to be good when the calculated diameter is not less than a threshold. The value of the input field 933 may be input automatically based on the values input to the input fields 931a to 931c. For example, the display control device 110 calculates the diameter necessary for joining the members having the thicknesses input to the input fields 931a to 931c according to a standard relating to welding. The calculated value is input automatically to the input field 933.

The number of voxels set when calculating the tilt and when inspecting the weld portion 13 is input to the input field 934. The lengths in the X-direction, the Y-direction, and the Z-direction of the voxels are input respectively in the input fields 935a to 935c. The details of the voxels are described in the estimation of the range of the weld portion 13 described below.

A menu for operating the inspection system 300 is displayed in the operation part 940. Icons 941 to 943 are displayed in the example of FIG. 4. When the icon 941 is clicked, the transmission of the ultrasonic waves from the probe 310 is started, and the calculation of the tilt is performed. Accordingly, the symbol 911 is displayed in the region 910. When the icon 942 is clicked, the inspection of the weld portion 13 is performed. For example, the inspection is performed using the detection result of the reflected waves directly before the icon 942 is clicked. When the icon 943 is clicked, the transmission of the ultrasonic waves from the probe 310 stops.

For example, the display of the setter 930 can be switched between collapsed and expanded by clicking an icon 939. Similarly, the display of the operation part 940 can be switched between collapsed and expanded by clicking an icon 949. The setter 930 and the operation part 940 may be displayed in the same window as the region 910 or may be displayed in another window.

When the symbol 911 is confirmed to have entered the tolerance range 912, the user clicks the icon 942. Thereby, the inspection of the weld portion 13 is performed in a state in which the tilt of the probe 310 is sufficiently small, and a more accurate inspection result is obtained. Other than the icon 942, a button for starting the inspection may be provided in the probe 310 or the inspection device 320.

Or, the inspection of the weld portion 13 may be performed automatically when the user changes the tilt of the probe 310 and the symbol 911 enters the tolerance range 912. For example, the display control device 110 pre-transmits the setting data of the tolerance range 912 to the inspection device 320. The inspection device 320 determines whether or not the tilt is within the tolerance range when calculating the tilt of the probe 310. The inspection of the weld portion 13 is started automatically when the tilt is within the tolerance range. It is unnecessary for the user to operate the icon 942 because the inspection is performed automatically. If the next reflected wave is detected after the symbol 911 enters the tolerance range 912 and before the icon 942 is operated, the inspection is performed based on the detection result of the reflected waves. If the symbol 911 is outside the tolerance range 912 when the newest detection result is acquired, there is a possibility that a correct inspection result may not be obtained. Such a problem can be solved by the inspection being performed automatically.

The inspection device 320 may determine whether or not the probe 310 appropriately contacts the object. If the probe 310 is not in contact, a detection result that reflects the state of the weld portion 13 is not obtained. If the calculation of the tilt or the inspection is performed using the detection result when the probe 310 is not in contact, there is a possibility that a mistaken result may be output. For example, the inspection device 320 determines whether or not the probe 310 contacts the object appropriately based on the intensity of the reflected wave. The intensity of the detected reflected wave is low when the probe 310 does not contact the object. The inspection device 320 determines the contact of the probe 310 by comparing the intensity of the reflected wave to a prescribed threshold.

In other words, the determination of whether or not the probe 310 contacts the object is the determination of whether or not the detection result of an appropriate reflected wave is obtained. For example, the probe 310 may not directly contact the object and may contact via a couplant. In such a case, the ultrasonic wave propagates sufficiently between the probe 310 and the object via the couplant. Therefore, a detection result that is suited to the calculation of the tilt or the inspection is obtained. Even when the probe 310 directly contacts the inspection object, there is a possibility that an appropriate detection result may not be obtained if the couplant is not filled sufficiently between the probe 310 and the inspection object. Here, the determination based on the detection result of the reflected waves that the detection result is usable in the calculation of the tilt or the inspection is called the probe 310 being in contact with the object.

For example, the inspection device 320 calculates the tilt of the probe 310 when determining that the probe 310 contacts the object. The inspection device 320 transmits the calculated tilt to the display control device 110. The display control device 110 updates the display of the symbol 911 according to the reception of the tilt. The inspection device 320 does not calculate the tilt when determining that the probe 310 does not contact the object. The inspection device 320 does not transmit the calculation result to the display control device 110. Or, the inspection device 320 may transmit, to the display control device 110, data indicating that the calculation of the tilt is invalid.

For example, the display control device 110 determines whether or not the tilt is transmitted continuously. The display control device 110 determines that the tilt cannot be acquired from the inspection system 300 when a prescribed period of time has elapsed from the reception of the directly-previous tilt, or when the data indicating invalidity is received. In such a case, the display control device 110 directly or indirectly displays in the user interface 900 that the probe 310 does not contact the object.

Figure 8A:
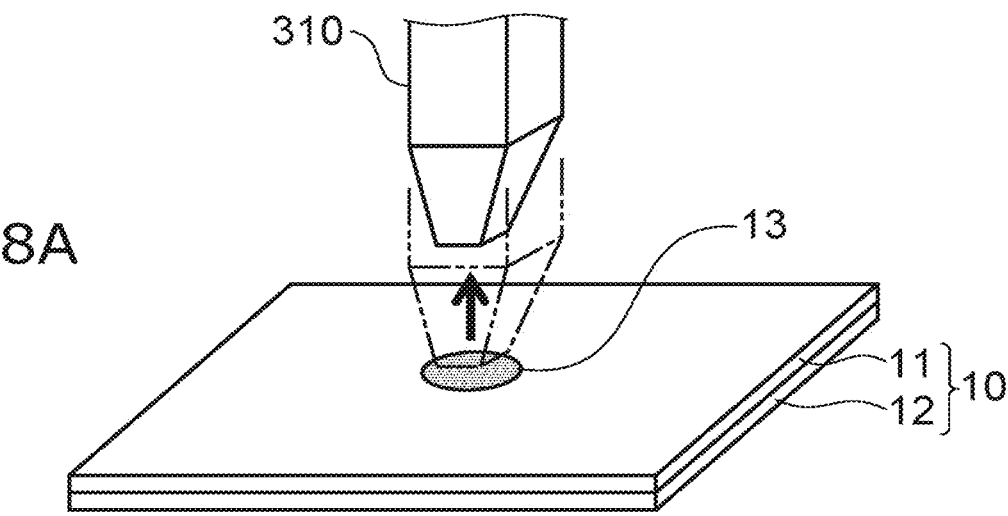
FIGS. 8A to 8C are drawings for describing the processing according to the display control system according to the embodiment.
Figure 8B:
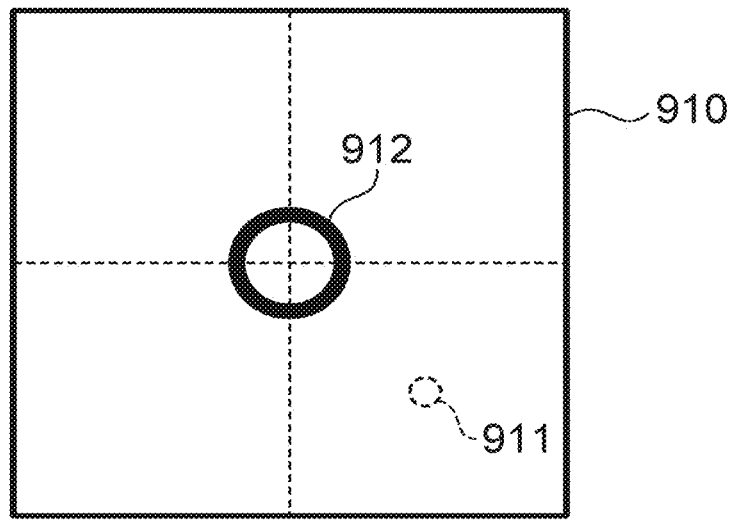
Figure 8C:
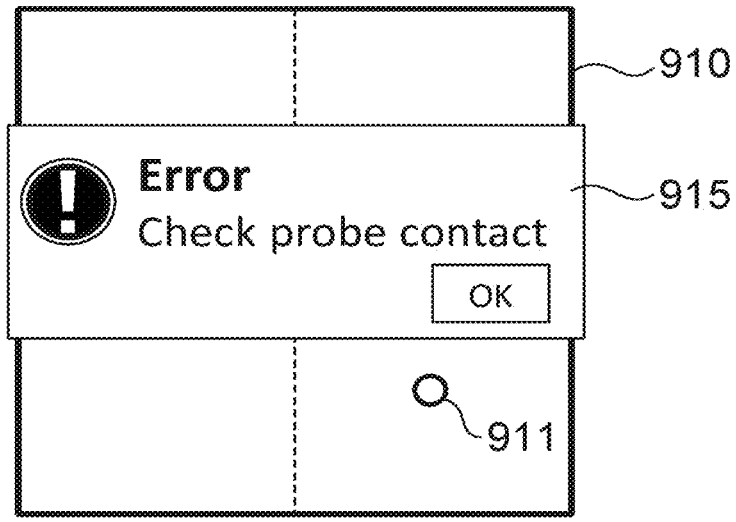

For example, as illustrated in FIG. 8A, the probe 310 that contacts the weld portion 13 is moved in a direction away from the member 10. The inspection device 320 determines that the probe 310 does not contact the object. For example, the display control device 110 erases the symbol 911 that was displayed from the region 910 as illustrated in FIG. 8B. Thereby, the non-contact of the probe 310 is notified indirectly to the user via the user interface 900. Or, the display control device 110 may display an error message 915 as illustrated in FIG. 8C. Thereby, the non-contact of the probe 310 is notified more directly to the user. By such notifications, the user can notice the non-contact of the probe 310 quickly. The user can restart the inspection more quickly by causing the probe 310 to appropriately contact the weld portion 13.

After determining that the probe 310 does not contact the object, the inspection device 320 restarts the calculation of the tilt when determining that the probe 310 contacts the object. The inspection device 320 transmits the calculated tilt to the display control device 110. When receiving the tilt, the display control device 110 restarts the display of the symbol 911. At this time, for example, the error message 915 is closed automatically.

The inspection result may be transmitted to the display control device 110 when the inspection of the weld portion 13 is performed by the inspection device 320. The display control device 110 causes the user interface 900 to display the inspection result. For example, as illustrated in FIG. 9A, an inspection result 950 is displayed in the user interface. Items 951 to 955 are displayed in the example.

The item 951 shows the determination result of the inspection. For example, "OK", "NG", or "NA" is displayed in the item 951. "OK" indicates that the weld is appropriate. "NG" indicates a non-weld. "NA" indicates that the inspection cannot be performed. The status of the weld portion 13 estimated from the detection result of the reflected waves is displayed in the item 952. For example, as the status, information such as "welded", "not welded", "weld portion too thin", "diameter too small", or the like is displayed. The diameter of the weld portion 13 estimated from the detection result of the reflected waves is displayed in the item 953. The longest diameter of the weld portion 13 is displayed in the item 954. The shortest diameter of the weld portion 13 is displayed in the item 955.

For example, as illustrated in FIG. 9B, a log of the operation of the inspection system 300 may be displayed in the user interface. For example, the log 960 that is illustrated in FIG. 9B displays the previous calculation results of the tilt, inspection results, etc.

For example, the display of the inspection result 950 can be switched between collapsed and expanded by clicking an icon 959. Similarly, the display of the log 960 can be switched between collapsed and expanded by clicking an icon 969. The inspection result 950 and the log 960 may be displayed in the same window as the region 910 or may be displayed in another window.

One specific example of the calculation method and the inspection method of the tilt will now be described.

Figure 10:
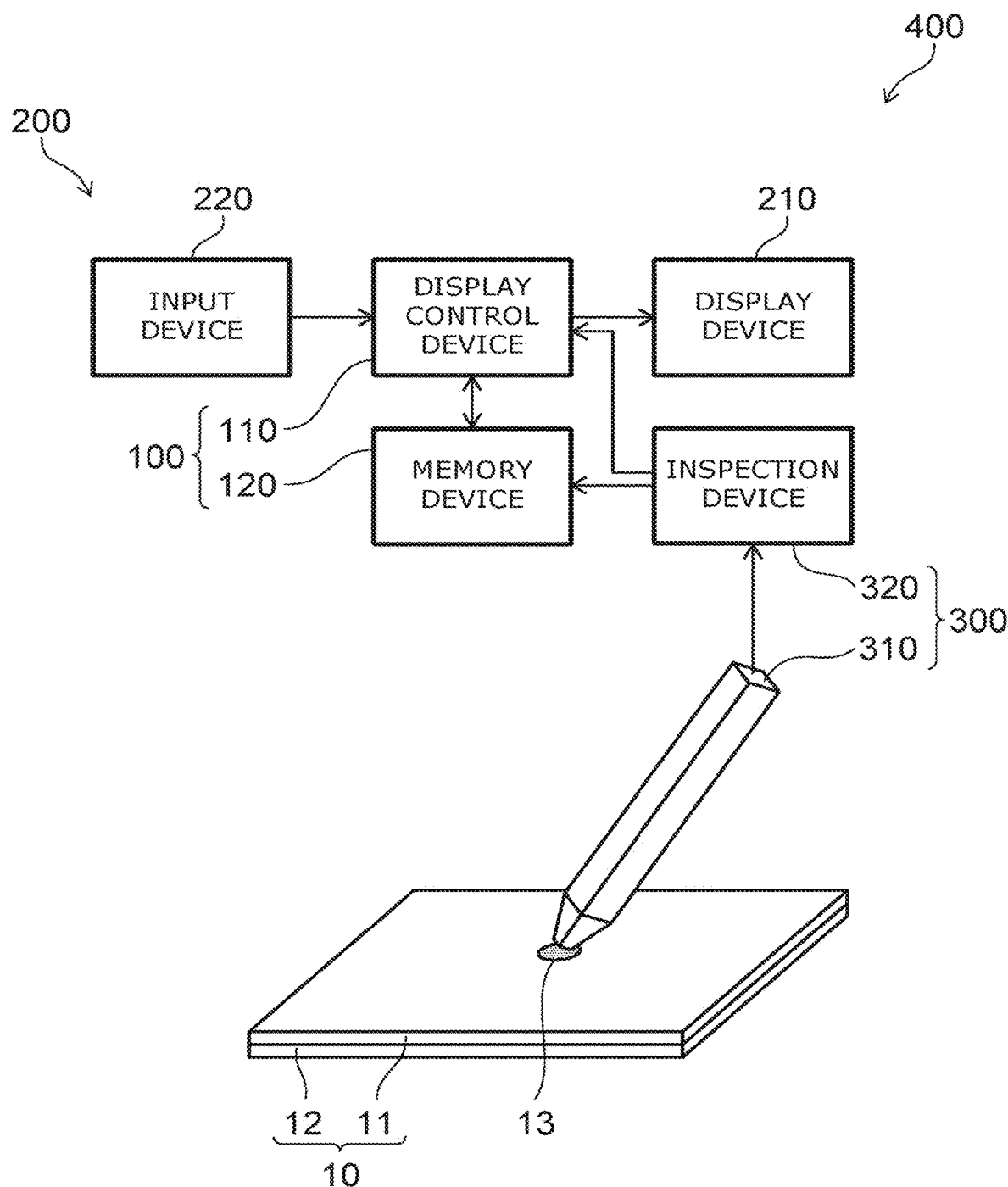
FIG. 10 is a schematic view illustrating a configuration of an inspection control system according to the embodiment.

FIG. 10 is a schematic view illustrating a configuration of an inspection control system according to the embodiment.

Figure 11:
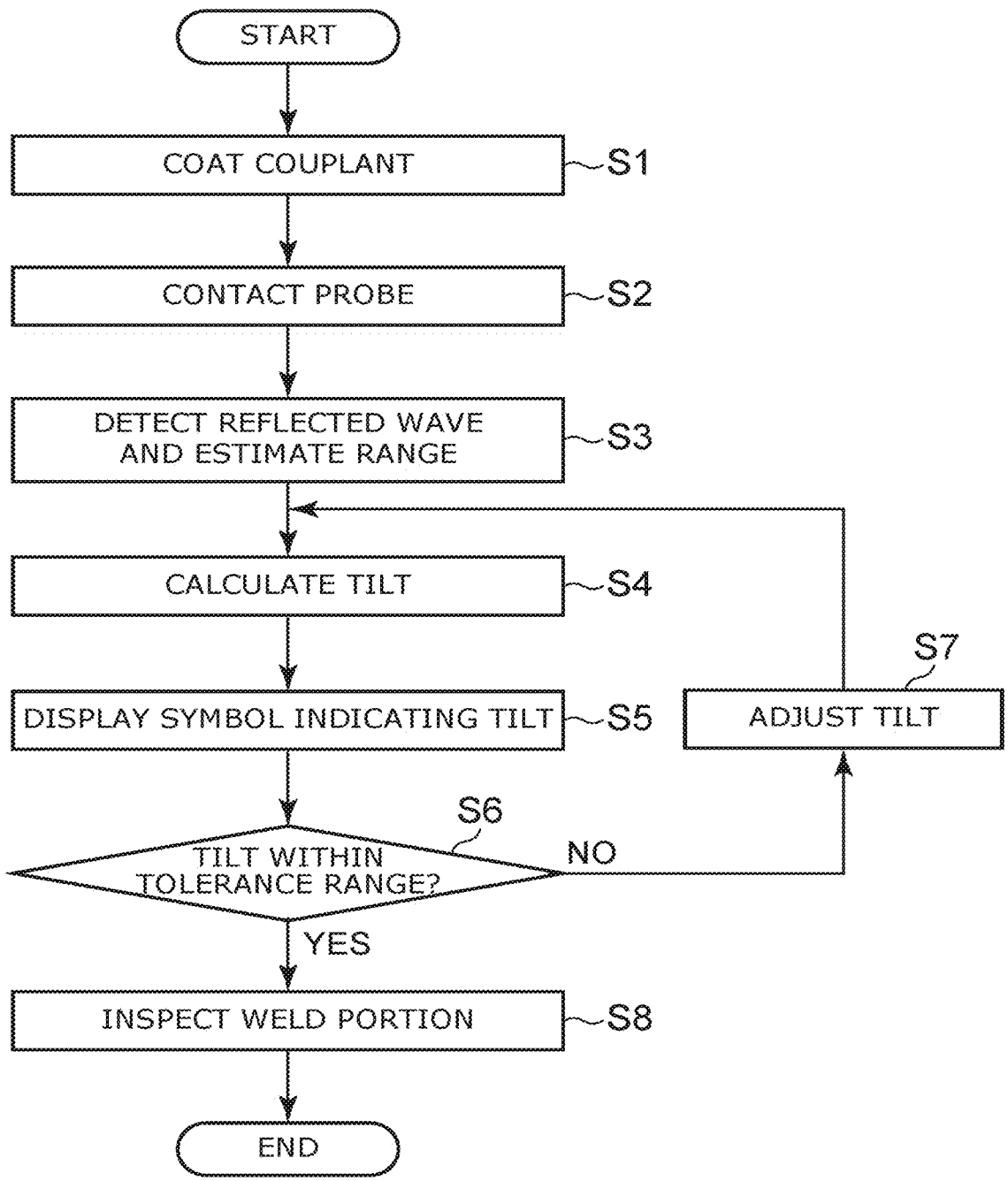
FIG. 11 is a flowchart illustrating the flow of the weld inspection using the inspection control system according to the embodiment.

FIG. 11 is a flowchart illustrating the flow of the weld inspection using the inspection control system according to the embodiment.

As illustrated in FIG. 10, the inspection control system 400 according to the embodiment includes the display system 200 and the inspection system 300. The user performs the weld inspection by using the inspection control system 400. Here, an example is described in which the user that performs the weld inspection inspects by holding the probe 310.

First, the user coats a couplant onto the weld portion 13 (step S1). The user causes the probe 310 to contact the weld portion 13 (step S2). In the state in which the probe 310 contacts the weld portion 13, the multiple ultrasonic sensors 312 transmit the ultrasonic waves toward the member 10 including the weld portion 13 and receive the reflected waves. The probe 310 transmits the detection result of the reflected waves to the inspection device 320. When receiving the detection result, the inspection device 320 estimates the range of the weld portion 13 in each of the X-direction, the Y-direction, and the Z-direction (step S3).

The inspection device 320 calculates the tilt of the probe 310 with respect to the weld portion 13 from the detection result of the reflected waves in the estimated range (step S4). The inspection device 320 transmits the calculated tilt to the display control device 110. When receiving the tilt, the display control device 110 causes the user interface 900 to display the symbol 911 corresponding to the tilt (step S5). The user determines whether or not the symbol 911 is within the tolerance range 912 (step S6). When the symbol 911 is not within the tolerance range 912, the user adjusts the tilt of the probe 310 so that the displayed symbol 911 approaches the tolerance range 912 (step S7). Step S4 is performed after the adjustment of the tilt. When the symbol 911 is within the tolerance range 912, the user performs the inspection of the weld portion 13 (step S8).

FIG. 12A is a schematic view for describing the inspection method according to the inspection system according to the embodiment.

As illustrated in FIG. 12A, a portion of the ultrasonic wave US is reflected by an upper surface 10a of the metal plate 11 or an upper surface 10b of the weld portion 13. Another portion of the ultrasonic wave US enters the member 10 and is reflected by a lower surface 10c of the metal plate 11 or a lower surface 10d of the weld portion 13.

The positions in the Z-direction of the upper surface 10a, the upper surface 10b, the lower surface 10c, and the lower surface 10d are different from each other. In other words, the distance in the Z-direction between the ultrasonic sensor 312 and these surfaces are different from each other. The peaks of the intensities of the reflected waves are detected when the ultrasonic sensor 312 receives the reflected waves from these surfaces. Which surface reflected the ultrasonic wave US can be verified by calculating the time until each peak is detected after transmitting the ultrasonic wave US.

The intensity of the reflected wave may be represented in any form. For example, the reflected wave intensity that is output from the ultrasonic sensor 312 may include positive values and negative values according to the phase. Various processing may be performed based on the reflected wave intensity including the positive values and the negative values. The reflected wave intensity that includes the positive values and the negative values may be converted into absolute values. The average value of the reflected wave intensities may be subtracted from the reflected wave intensity at each time. Or, the weighted average value, the weighted moving average value, or the like of the reflected wave intensities may be subtracted from the reflected wave intensity at each time. The various processing described herein can be performed even when the results of such processing applied to the reflected wave intensity are used.

FIG. 12B and FIG. 12C are graphs illustrating the relationship between the time after transmitting the ultrasonic wave US and the intensity of the reflected wave RW. In FIG. 12B and FIG. 12C, the vertical axis is the elapsed time after transmitting the ultrasonic wave US. The horizontal axis is the intensity of the detected reflected wave RW. Here, the intensity of the reflected wave RW is illustrated as an absolute value. The graph of FIG. 12B illustrates the detection result of the reflected waves RW from the upper surface 10a and the lower surface 10c of the metal plate 11. The graph of FIG. 12C illustrates the detection result of the reflected waves RW from the upper surface 10b and the lower surface 10d of the weld portion 13.

In the graph of FIG. 12B, a peak Pe1 occurring first is based on the reflected wave RW from the upper surface 10a. A peak Pe2 occurring second is based on the reflected wave RW from the lower surface 10c. The times when the peak Pe1 and the peak Pe2 are detected correspond respectively to the positions in the Z-direction of the upper surface 10a and the lower surface 10c of the metal plate 11. A time difference TD1 between the time when the peak Pe1 is detected and the time when the peak Pe2 is detected corresponds to a distance Di1 in the Z-direction between the upper surface 10a and the lower surface 10c.

Similarly, in the graph of FIG. 12C, a peak Pe3 occurring first is based on the reflected wave RW from the upper surface 10b. A peak Pe4 occurring second is based on the reflected wave RW from the lower surface 10d. The times when the peak Pe3 and the peak Pe4 are detected correspond respectively to the positions in the Z-direction of the upper surface 10b and the lower surface 10d of the weld portion 13. A time difference TD2 between the time when the peak Pe3 is detected and the time when the peak Pe4 is detected corresponds to a distance Di2 in the Z-direction between the upper surface 10b and the lower surface 10d.

There are cases where the upper surface 10b and the lower surface 10d of the weld portion 13 are tilted with respect to the upper surface 10a of the metal plate 11. This is due to the weld portion 13 including the solidified portion 14, shape deformation in the welding process, etc. In such a case, it is desirable for the ultrasonic wave US to be transmitted along a direction that is, on average, perpendicular to the upper surface 10b or the lower surface 10d. Thereby, the ultrasonic wave can be reflected more strongly at the upper surface 10b and the lower surface 10d, and the accuracy of the inspection can be increased.

Step S3 will now be described in detail with reference to FIG. 13A to FIG. 19.

Figure 13A:
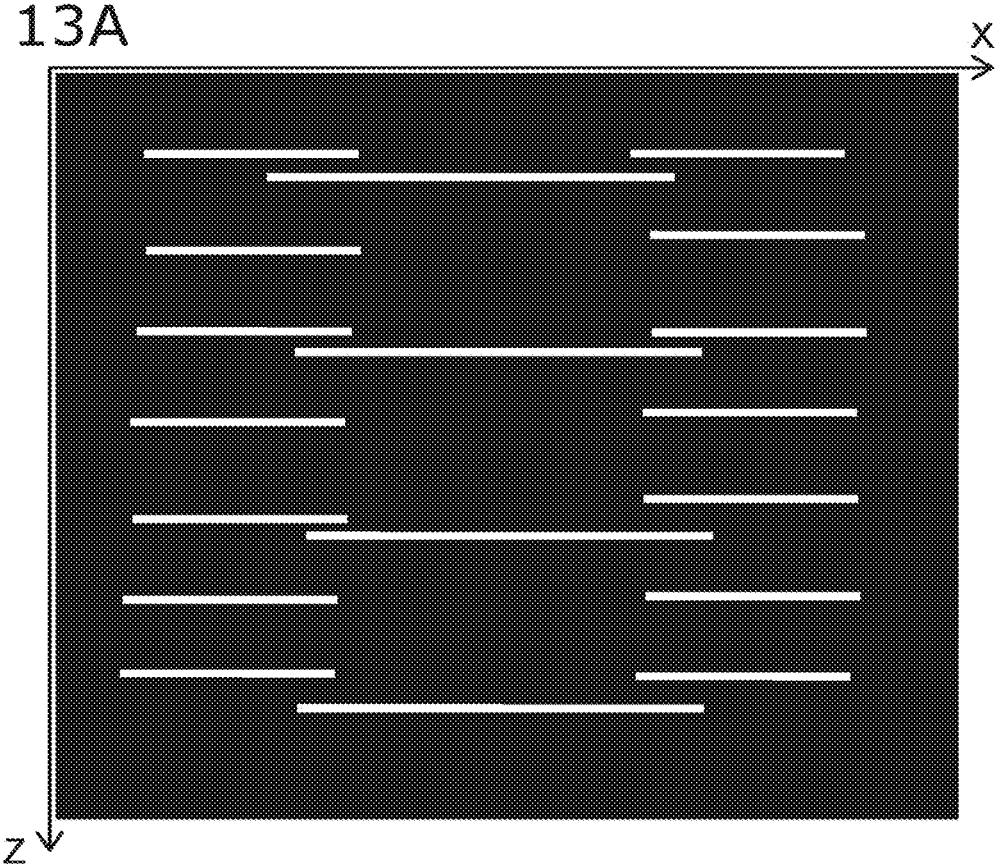
FIG. 13A and FIG. 13B are schematic views of images based on the detection result of the reflected waves.
Figure 13B:
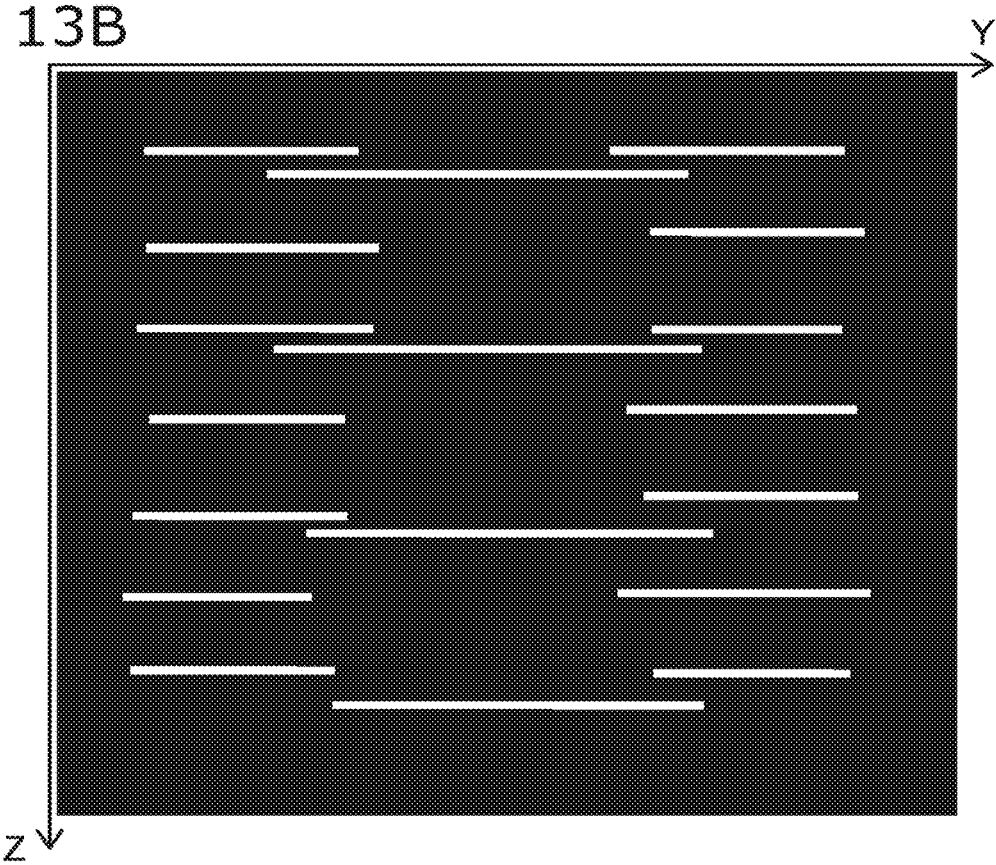

FIG. 13A and FIG. 13B are schematic views of images based on the detection result of the reflected waves.

FIG. 13A illustrates the state of the inspection object in the X-Z cross section. FIG. 13B illustrates the state of the inspection object in the Y-Z cross section.

In FIG. 13A and FIG. 13B, the points where the intensity of the reflected wave is high are illustrated using white. Here, the binarized intensity of the reflected wave is illustrated schematically. The position in the Z-direction corresponds to the time from emitting the ultrasonic wave until the reflected wave is received. The white lines that extend along the X-direction or the Y-direction illustrate the surfaces of the member.

In FIG. 13A and FIG. 13B, multiple white lines that exist at the center in the X-direction or the Y-direction are based on the reflected waves from the upper surface 10b and the lower surface 10d of the weld portion 13. The multiple white lines that exist at the end side in the X-direction or the Y-direction are based on the reflected waves from the upper surface 10a and the lower surface 10c of the metal plate 11 or the upper surface and the lower surface of the metal plate 12. Three or more white lines exist in the Z-direction in FIG. 13A and FIG. 13B. This shows that the ultrasonic wave US undergoes multiple reflections between the upper surface and the lower surface of each portion of the member 10.

As illustrated in FIG. 13A and FIG. 13B, the detection result of the reflected waves from the matrix sensor 311 also includes reflected waves from portions other than the weld portion 13. The inspection device 320 estimates the range of the weld portion 13 from the detection result of the reflected waves.

Here, as illustrated in FIG. 13A and FIG. 13B, the detection result of the reflected waves is illustrated two-dimensionally. The detection result of the reflected waves may be illustrated three-dimensionally. For example, the member 10 is illustrated by multiple voxels. Coordinates in the X-direction, the Y-direction, and the Z-direction are set for each of the voxels. A reflected wave intensity is associated with each of the voxels based on the detection result of the reflected waves. The inspection device 320 estimates a range (a group of voxels) corresponding to the weld portion 13 for the multiple voxels.

The number of voxels and the size of each voxel that are set may be determined automatically or may be set by the user via the user interface 900. For example, the user can set the number of voxels and the size of each voxel by inputting values to the input fields 934 and 935a to 935c of the setter 930 illustrated in FIG. 4.

Figure 14A:
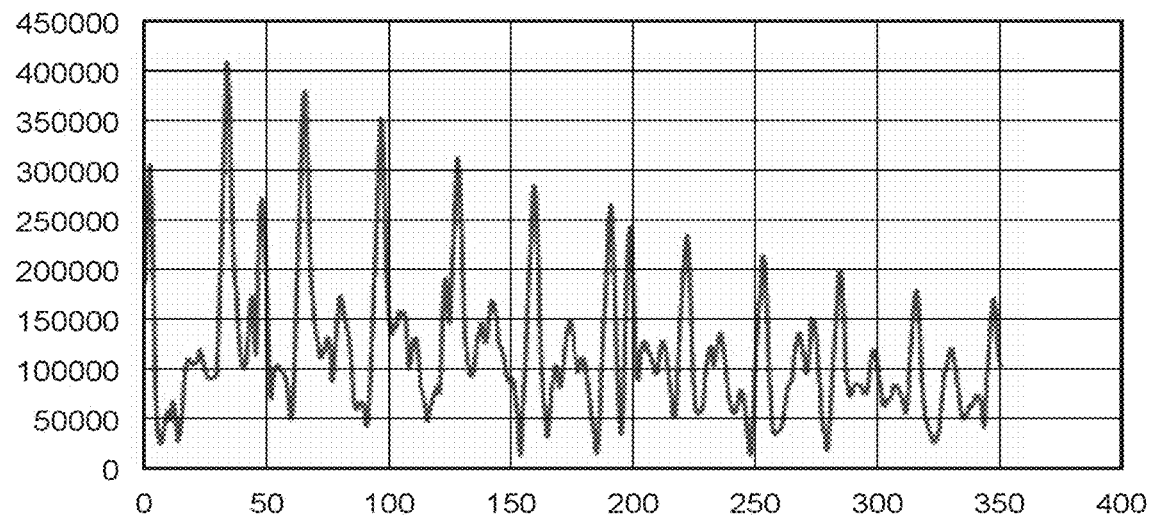
FIG. 14A and FIG. 14B are graphs illustrating the intensity distribution of the reflected waves in the Z-direction for one cross section.
Figure 14B:
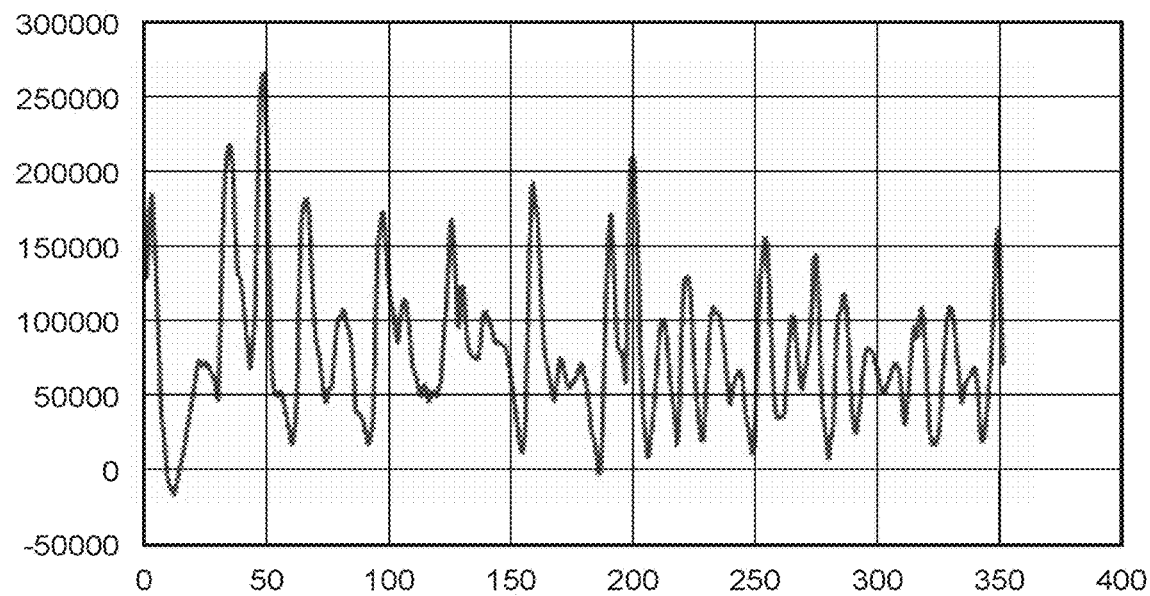

FIG. 14A and FIG. 14B are graphs illustrating the intensity distribution of the reflected waves in the Z-direction for one cross section.

Figure 15:
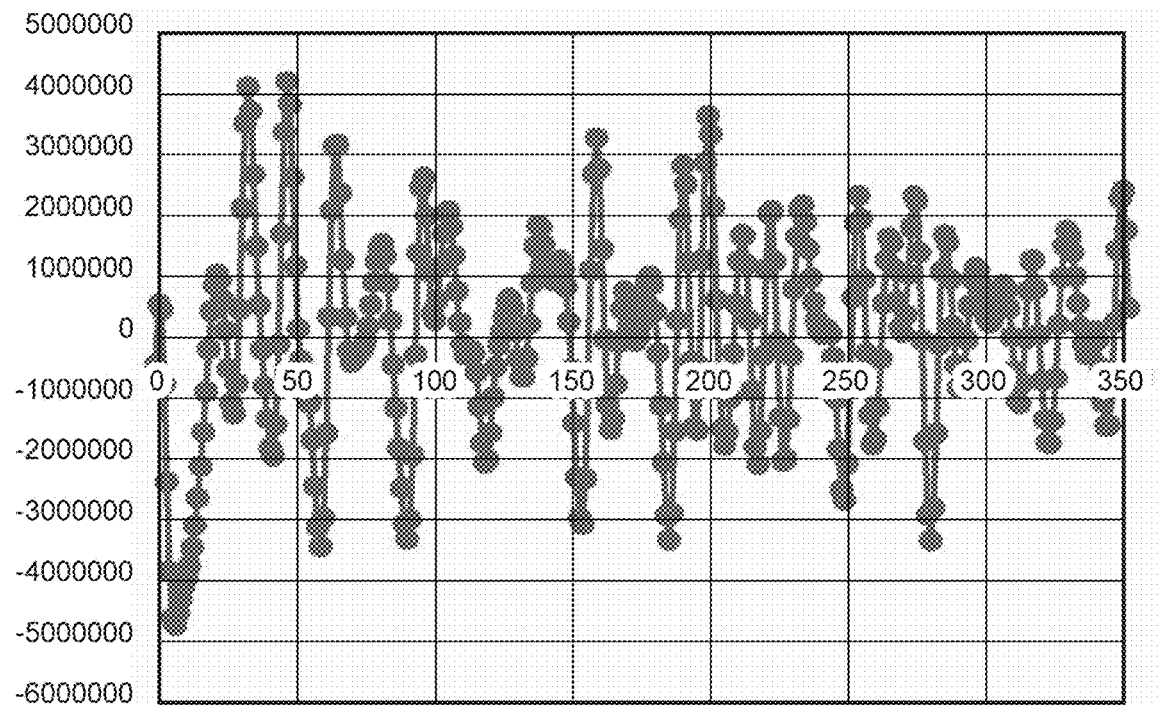
FIG. 15 is a graph illustrating the intensity distribution of the reflected waves in the Z-direction.

FIG. 15 is a graph illustrating the intensity distribution of the reflected waves in the Z-direction.

The inspection device 320 calculates the intensity distribution of the reflected waves in the Z-direction based on the detection result of the reflected waves. FIG. 14A and FIG. 14B are such examples. In FIG. 14A and FIG. 14B, the horizontal axis is the position in the Z-direction, and the vertical axis is the intensity of the reflected wave. FIG. 14A illustrates the intensity distribution of the reflected waves in the Z-direction in one X-Z cross section. FIG. 14B illustrates the intensity distribution of the reflected waves in the Z-direction in one Y-Z cross section. FIG. 14A and FIG. 14B illustrate the results in which the reflected wave intensities are converted into absolute values.

Or, the inspection device 320 may generate the intensity distribution of the reflected waves in the Z-direction by summing the reflected wave intensities in the X-Y plane for each of multiple points in the Z-direction. FIG. 15 is such an example. In FIG. 15, the horizontal axis is the position in the Z-direction, and the vertical axis is the intensity of the reflected wave. FIG. 15 illustrates the results of converting the reflected wave intensities into absolute values and subtracting the average value of the reflected wave intensities from the reflected wave intensity for each of the multiple points in the Z-direction.

The intensity distribution of the reflected waves in the Z-direction includes components reflected by the upper surface and the lower surface of the weld portion and components reflected by the upper surface and the lower surface of other portions. In other words, the intensity distribution includes periodic components corresponding to the time difference TD1 illustrated in FIG. 12B and periodic components corresponding to the time difference TD2 illustrated in FIG. 12C.

The inspection device 320 uses filtering to extract only the components reflected by the upper surface and the lower surface of the weld portion from the intensity distribution of the reflected waves. For example, values that correspond to integer multiples of half of the thickness in the Z-direction (the distance between the upper surface and the lower surface) of the weld portion are preset. The inspection device 320 extracts only the periodic components of the values by referring to the values.

A band-pass filter, a zero-phase filter, a low-pass filter, a high-pass filter, threshold determination of the intensity after the filtering, etc., can be used as the filtering.

Figure 16:
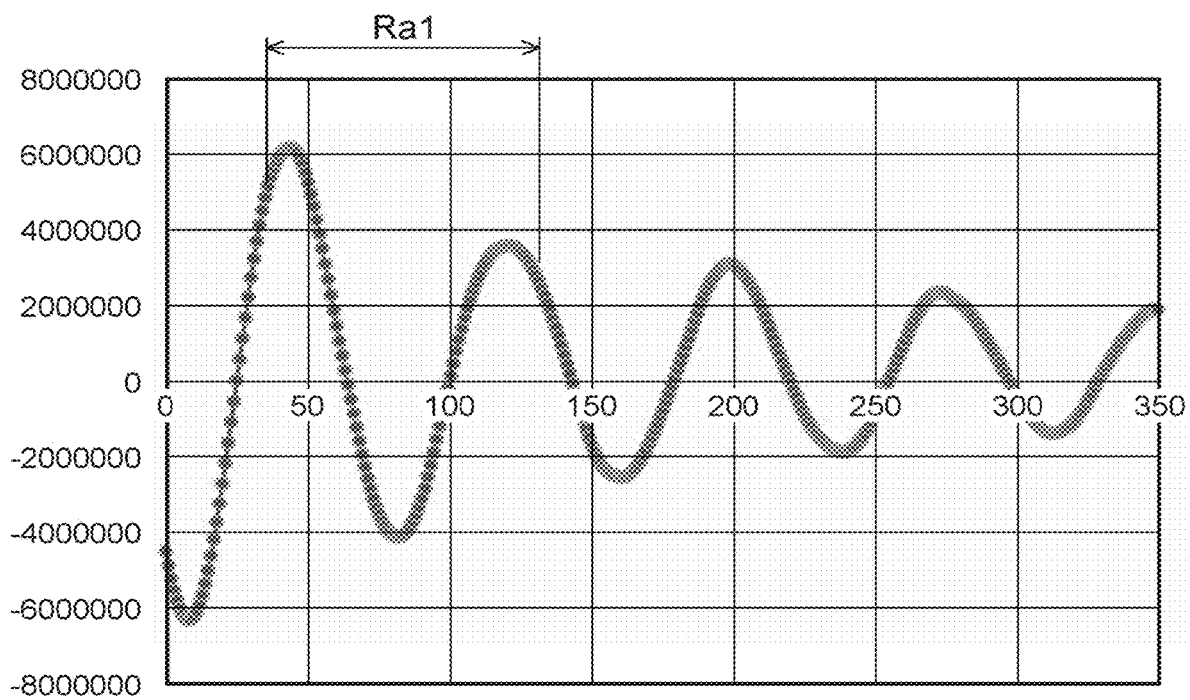
FIG. 16 is a graph illustrating the results of filtering the intensity distribution of the reflected waves.

FIG. 16 is a graph illustrating the results of filtering the intensity distribution of the reflected waves.

In FIG. 16, the horizontal axis is the position in the Z-direction, and the vertical axis is the intensity of the reflected waves. In the results of the filtering as illustrated in FIG. 16, only the components reflected by the upper surface and the lower surface of the weld portion are extracted.

The inspection device 320 estimates the range of the weld portion in the Z-direction based on the extraction results. For example, the inspection device 320 detects peaks included in the extraction results. The inspection device 320 detects the position in the Z-direction of a first peak and the position in the Z-direction of a second peak. For example, the inspection device 320 uses these positions as a reference to estimate a range Ra1 illustrated in FIG. 16 to be the range of the weld portion in the Z-direction.

There are cases where the sign (positive or negative) of the reflected wave intensity from the upper surface of the weld portion and the sign of the reflected wave intensity from the lower surface of the weld portion are reversed due to the structure of the weld portion, the configuration of the matrix sensor 311, etc. In such a case, the inspection device 320 may detect a peak of one of positive or negative and another peak of the other of positive or negative. The inspection device 320 uses the positions of these peaks as references to estimate the range of the weld portion in the Z-direction. Also, according to the processing of the reflected wave intensity, there are cases where the reflected wave intensity has only positive values or negative values. In such a case, the range of the weld portion in the Z-direction may be estimated based on the positions of multiple peaks, may be estimated based on the positions of the peak and the bottom, or may be estimated based on the positions of multiple bottoms. In other words, the inspection device 320 uses the reflected wave intensity after the filtering to estimate the range of the weld portion in the Z-direction based on the positions of multiple extrema.

When the intensity distribution of the reflected waves is generated for each of the X-Z cross section and the Y-Z cross section, the range in the Z-direction based on the intensity distribution in the X-Z cross section and the range in the Z-direction based on the intensity distribution in the Y-Z cross section are estimated. For example, the inspection device 320 calculates the average, the weighted average, the weighted moving average, or the like of the multiple estimation results and estimates the calculation result to be the range of the entire weld portion in the Z-direction.

Or, the inspection device 320 may estimate the range of the weld portion in the Z-direction based on the intensity distribution of the reflected waves for one of the X-Z cross section or the Y-Z cross section and use the estimation result as the range of the entire weld portion in the Z-direction. The inspection device 320 may estimate the range of the weld portion in the Z-direction based on the intensity distribution of the reflected waves for a portion in the X-direction and a portion in the Y-direction and use the estimation result as the range of the entire weld portion in the Z-direction. The calculation amount necessary for the generation of the intensity distribution of the reflected waves can be reduced by such processing.

In the example of FIG. 16, the position in the Z-direction of the lower limit of the range Ra1 is set by subtracting a prescribed value from the position in the Z-direction of the first peak. The position in the Z-direction of the upper limit of the range Ra1 is set by adding a prescribed value to the position in the Z-direction of the second peak. Thereby, the second peak can be suppressed from being outside the range in the Z-direction of the weld portion at some point in the X-Y plane if the upper surface and the lower surface of the weld portion are tilted with respect to the arrangement direction of the ultrasonic sensors 312.

After estimating the range of the weld portion in the Z-direction, the inspection device 320 estimates the range of the weld portion in the X-direction and the range of the weld portion in the Y-direction.

Figure 17:
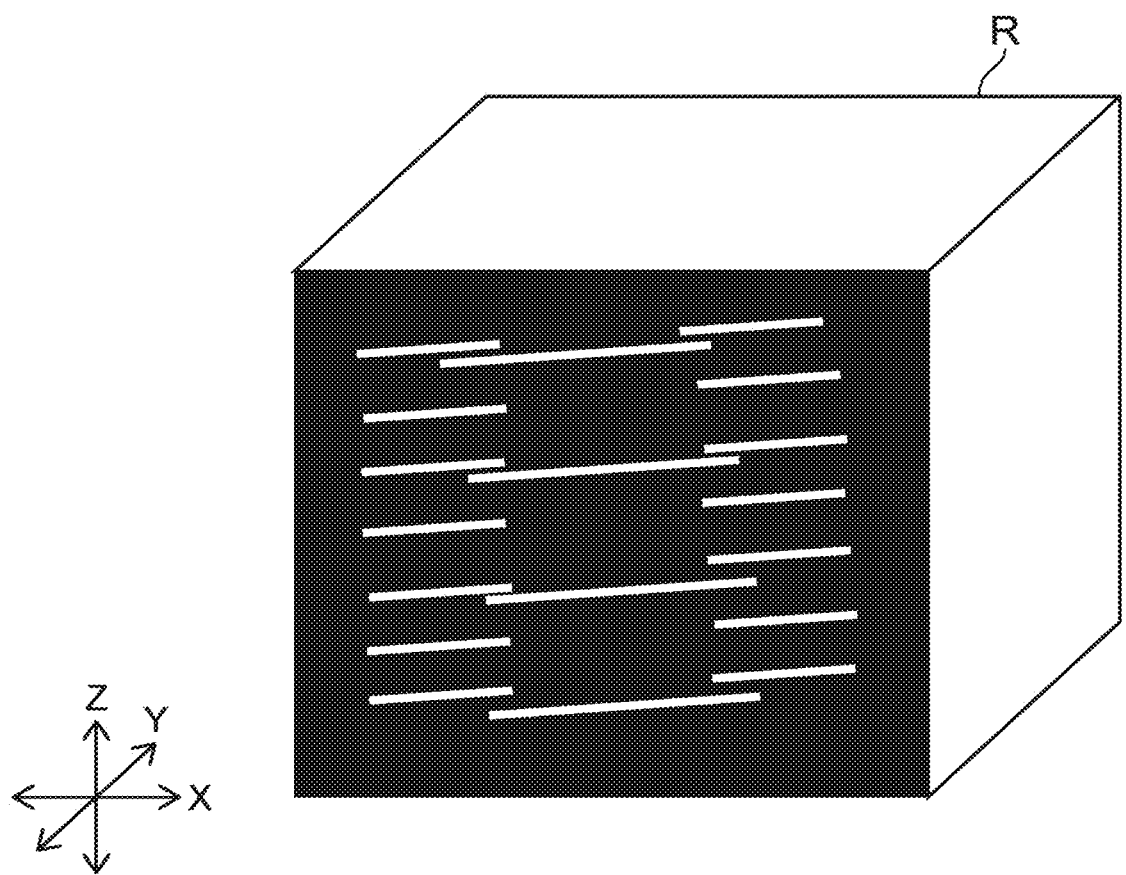
FIG. 17 is a schematic view illustrating the detection result of the reflected waves.
Figure 19:
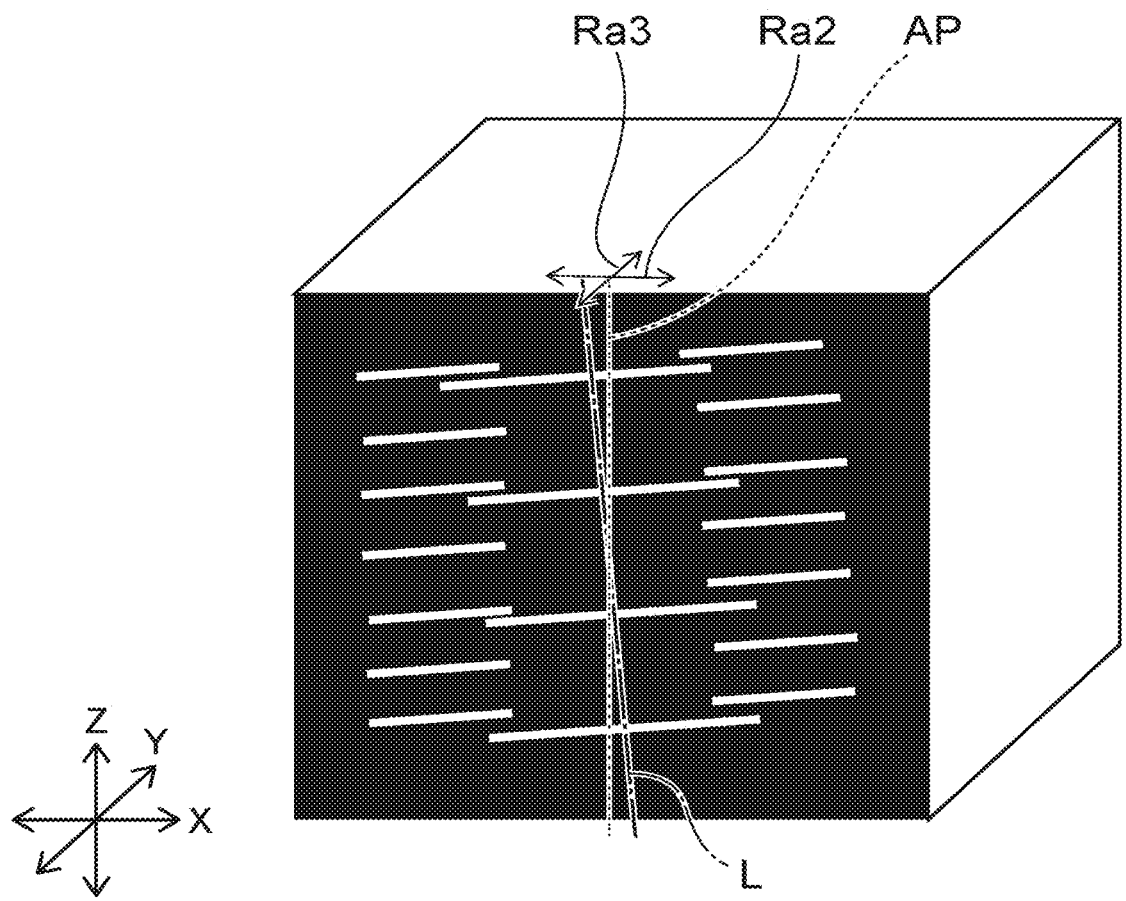
FIG. 19 is a schematic view illustrating the detection result of the reflected waves.

FIG. 17 and FIG. 19 are schematic views illustrating the detection result of the reflected waves.

In FIG. 17 and FIG. 19, a region R is the entire region where the detection result of the reflected waves is obtained by the matrix sensor 311. One cross section of the region R includes the components of the reflected waves of the upper surface and the lower surface of the weld portion and the components of the reflected waves of the upper surface and the lower surface of the other portions.

The inspection device 320 generates the intensity distribution of the reflected waves in the X-Y plane for each of multiple points in the Z-direction. The inspection device 320 may generate the intensity distribution within a preset range in the Z-direction. The calculation amount can be reduced thereby. Or, the inspection device 320 may generate the intensity distribution within the estimated range in the Z-direction. Thereby, the reflected wave component being outside the lower surface of the weld portion when generating the intensity distribution of the reflected waves in the X-Y plane can be suppressed while reducing the calculation amount.

Figure 18A:
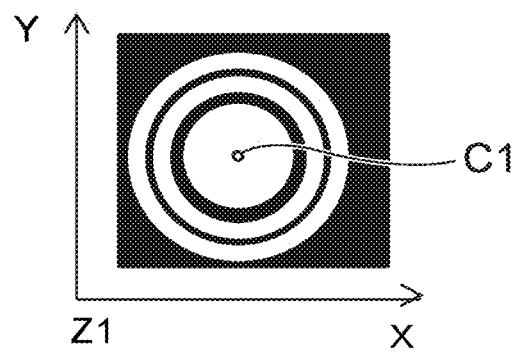
FIGS. 18A to 18C are examples of the intensity distribution of the reflected waves in the X-Y plane.
Figure 18B:
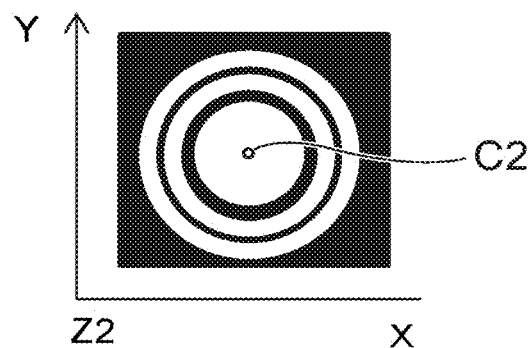
Figure 18C:
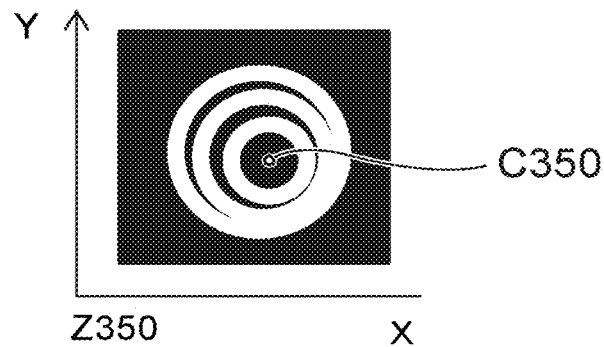

FIG. 18A to FIG. 18C are examples of the intensity distribution of the reflected waves in the X-Y plane. FIG. 18A illustrates the intensity distribution of the reflected waves in the X-Y plane at the coordinate of Z=1. FIG. 18B illustrates the intensity distribution of the reflected waves in the X-Y plane at the coordinate of Z=2. FIG. 18C illustrates the intensity distribution of the reflected waves in the X-Y plane at the coordinate of Z=350. The binarized intensity of the reflected wave is illustrated schematically in FIG. 17, FIG. 18A to FIG. 18C, and FIG. 19.

The inspection device 320 calculates the centroid position of the intensity distribution of the reflected waves in the X-Y plane for each of the multiple points in the Z-direction. Here, the centroid position of the intensity distribution is obtained by calculating the centroid position of an image of the intensity distribution. For example, as illustrated in FIG. 18A to FIG. 18C, the inspection device 320 calculates centroid positions C1 to C350 of the images. FIG. 19 illustrates the results of a line segment L connecting all of the centroid positions from Z=0 to Z=350.

The inspection device 320 averages the centroid positions from Z=0 to Z=350. The average position of the centroids in the X-direction and the average position of the centroids in the Y-direction are obtained thereby. In FIG. 19, an average position AP illustrates the average position of the centroids in the X-direction and the average position of the centroids in the Y-direction. The inspection device 320 uses prescribed ranges in the X-direction and the Y-direction from the average position AP at the center as a range Ra2 of the weld portion in the X-direction and a range Ra3 of the weld portion in the Y-direction.

For example, a value V that indicates the diameter of the probe 310 (the matrix sensor 311) is preset to estimate the range Ra2 and the range Ra3. The inspection device 320 uses the ranges of AP−V/2 to AP+V/2 as the range Ra2 and the range Ra3 respectively in the X-direction and the Y-direction. In such a case, the estimated range in the X-Y plane is quadrilateral. The estimated range is not limited to the example; the estimated range in the X-Y plane may have a polygonal shape having five or more corners, a circular shape, etc. The shape of the estimated range in the X-Y plane is modifiable as appropriate according to the shape of the weld portion.

The range Ra2 and the range Ra3 may be determined using another value based on the value V. Instead of the value indicating the diameter of the probe 310, a value that indicates the diameter of the weld portion may be preset. This is because the diameter of the weld portion corresponds to the diameter of the probe 310. The value that indicates the diameter of the weld portion can be considered to be a value that substantially indicates the diameter of the probe 310.

The range Ra1 in the Z-direction, the range Ra2 in the X-direction, and the range Ra3 in the Y-direction of the weld portion are estimated by the processing described above. After the ranges are estimated, step S4 illustrated in FIG. 11 is performed based on the detection result of the reflected waves in the estimated ranges.

Figure 20:
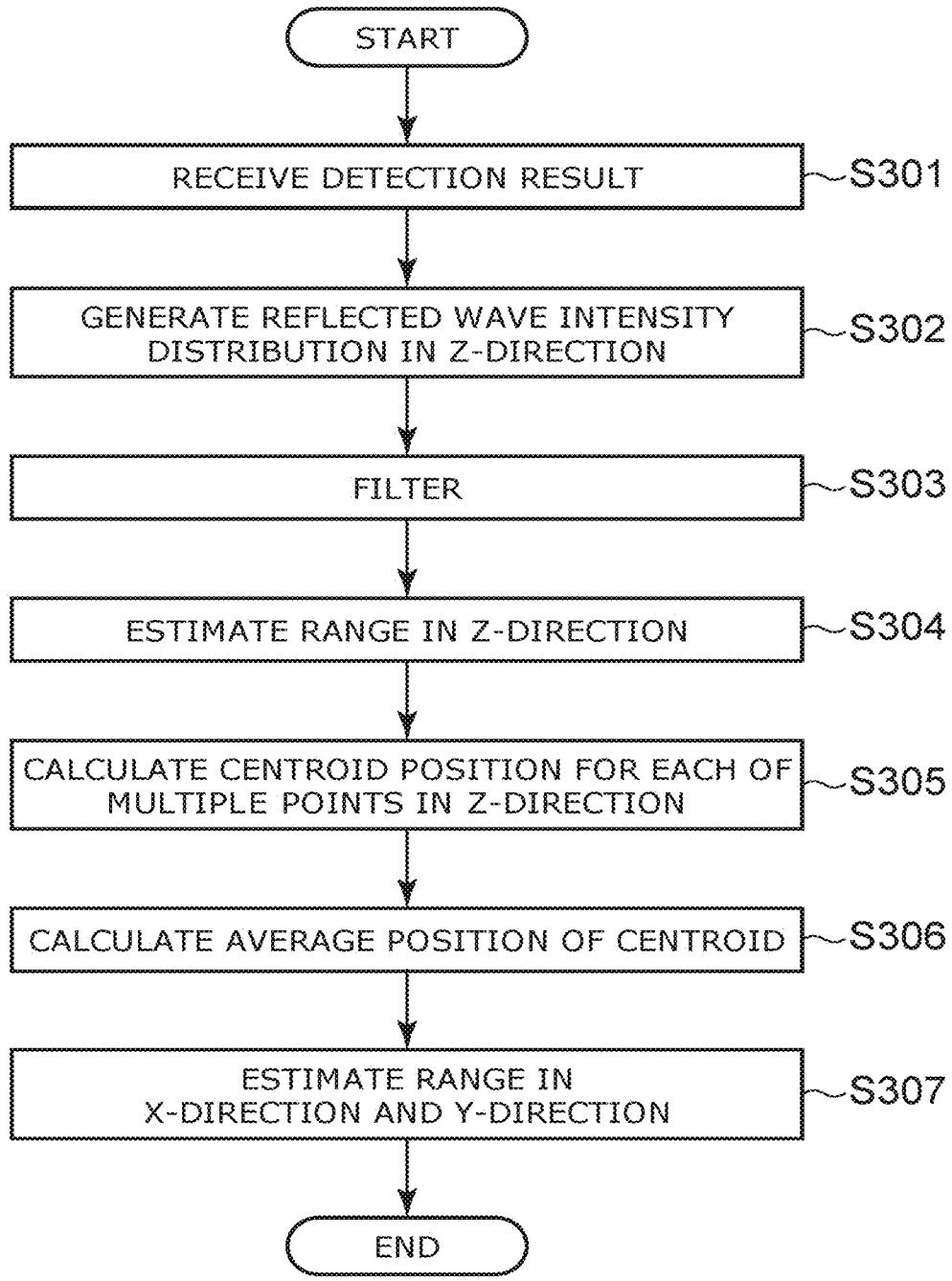
FIG. 20 is a flowchart illustrating an operation of the inspection system according to the embodiment.

FIG. 20 is a flowchart illustrating an operation of the inspection system according to the embodiment.

The inspection device 320 receives the detection result of the reflected waves from the probe 310 (step S301). Based on the detection result, the inspection device 320 generates the intensity distribution of the reflected waves in the Z-direction (step S302). The inspection device 320 filters the intensity distribution based on a value of the thickness of the weld portion (step S303). Thereby, only the reflected wave components of the weld portion are extracted from the intensity distribution. Based on the extraction results, the inspection device 320 estimates the range of the weld portion in the Z-direction (step S304). The inspection device 320 calculates the centroid position of the reflected wave intensity in the X-Y plane for each of multiple points in the Z-direction (step S305). The inspection device 320 calculates the average position by averaging the multiple calculated centroid positions (step S306). Based on the average position and the diameter of the probe 310, the inspection device 320 estimates the range in each of the X-direction and the Y-direction (step S307).

The estimation of the range in the Z-direction may be performed after estimating the ranges in the X-direction and the Y-direction. For example, steps S302 to S304 may be performed after steps S305 to S307 in the flowchart illustrated in FIG. 20. In such a case, the inspection device 320 may calculate the intensity distribution of the reflected waves in the Z-direction within the estimated ranges in the X-direction and the Y-direction. The calculation amount can be reduced thereby.

Figure 21:
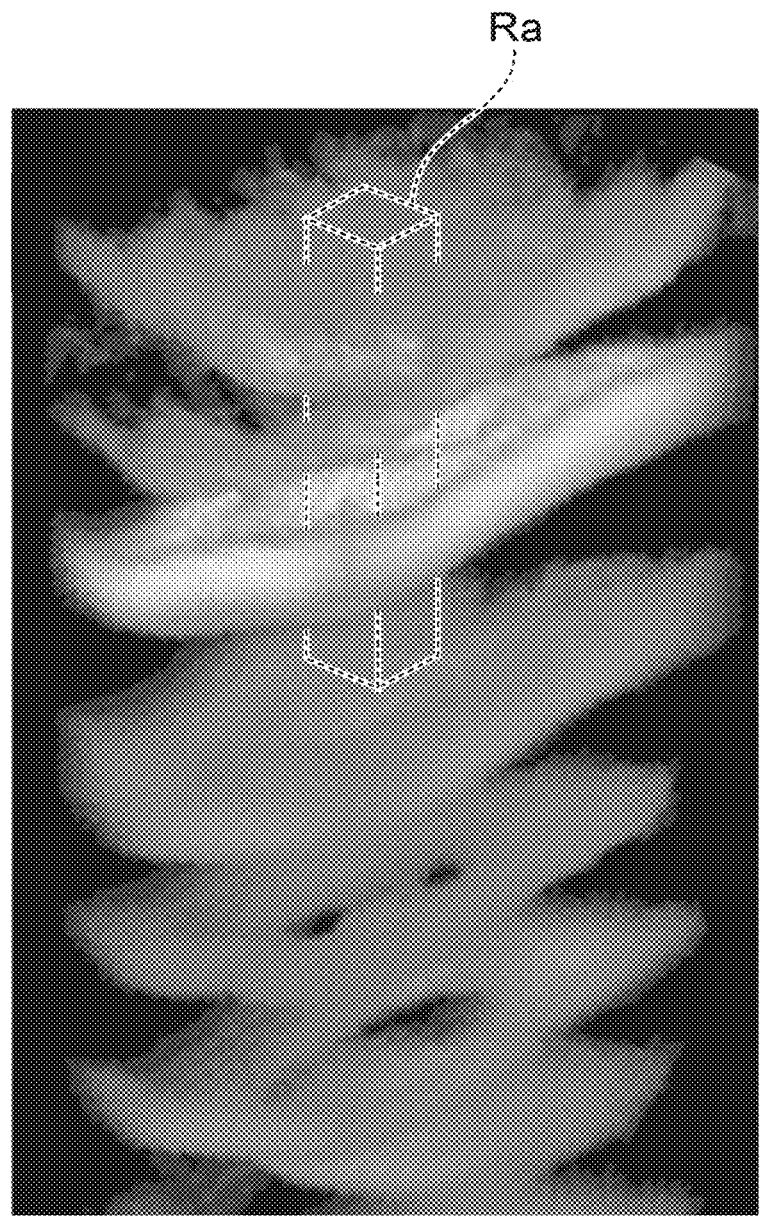
FIG. 21 is an image illustrating a detection result of the reflected waves.
Figure 21:
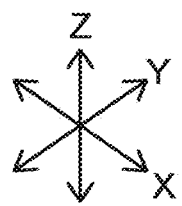

FIG. 21 is an image illustrating a detection result of the reflected waves.

In FIG. 21, whiter colors show that the intensity of the reflected wave is greater at that point. The inspection device 320 performs the operation illustrated in FIG. 20 for the detection result illustrated in FIG. 21. As a result, a range Ra is estimated.

One specific example of a method for calculating the tilt in the range Ra will now be described.

Figure 22:
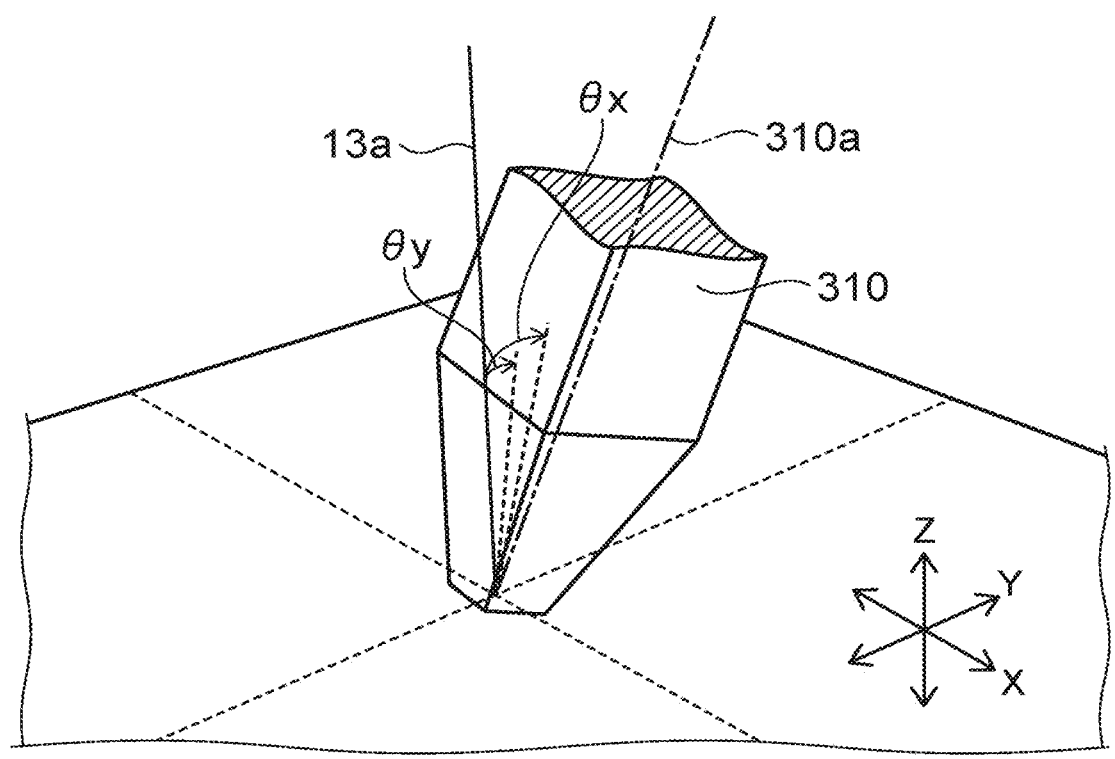
FIG. 22 is a drawing for describing the processing according to the inspection system according to the embodiment.

FIG. 22 is a drawing for describing the processing according to the inspection system according to the embodiment.

FIG. 23 and FIGS. 24A to 24C are examples of images obtained by the inspection system according to the embodiment.

Figure 23:
FIG. 23 is an example of images obtained by the inspection system according to the embodiment.
Figure 23:
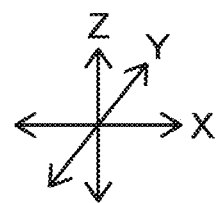
Figure 24A:
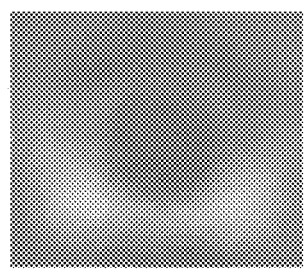
FIGS. 24A to 24C are examples of images obtained by the inspection system according to the embodiment.
Figures 24B, 24C:
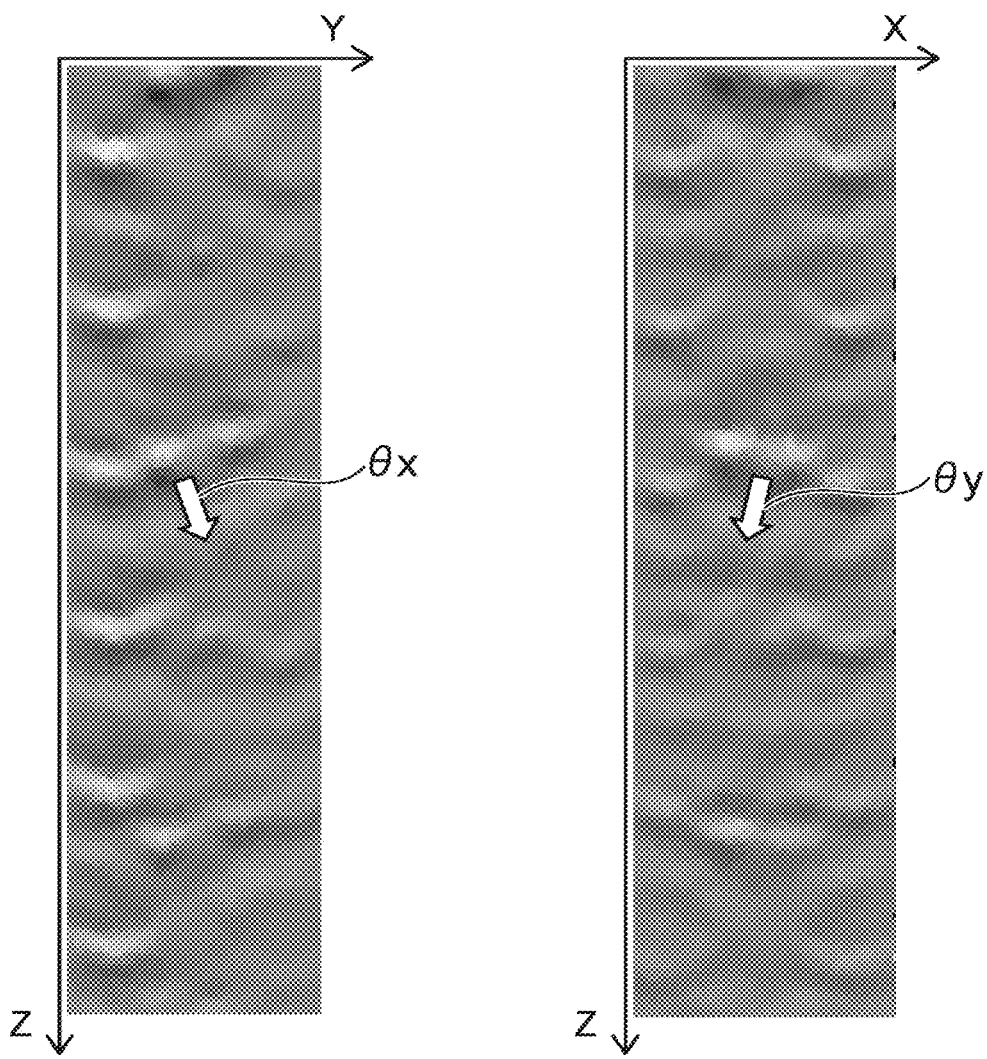

FIG. 23 is three-dimensional volume data depicted based on the detection result of the reflected waves. FIG. 24A illustrates the surface of the weld portion 13 in the volume data illustrated in FIG. 23. FIG. 24B illustrates the Y-Z cross section at the weld portion 13 vicinity in the volume data illustrated in FIG. 23. FIG. 24C illustrates the X-Z cross section at the weld portion 13 vicinity in the volume data illustrated in FIG. 23. In FIG. 24B and FIG. 24C, the upper side is the surface of the weld portion, and the data downward in the depth direction is shown. The portions where the luminance is high are portions where the reflection intensity of the ultrasonic wave is large. The ultrasonic wave is reflected strongly by the bottom surface of the weld portion 13, a surface between the members not joined to each other, etc.

The tilt of the probe 310 corresponds to the angle between a direction 13a perpendicular to the weld portion 13 and a direction 310a of the probe 310 illustrated in FIG. 22. This angle is expressed as an angle $\theta x$ around the X-direction and an angle $\theta y$ around the Y-direction. The direction 310a of the probe 310 is perpendicular to the arrangement direction of the ultrasonic sensors 312.

The angle $\theta x$ is calculated based on the detection result in the Y-Z cross section as illustrated in FIG. 24B. The angle $\theta y$ is calculated based on the detection result in the X-Z cross section as illustrated in FIG. 24C. The inspection device 320 calculates the average of the three-dimensional luminance gradients in the cross sections as the angle $\theta x$ and $\theta y$. The inspection device 320 transmits the calculated angle θx and θy to the display control device 110 as the tilt of the probe 310 and stores the angle θx and θy in the memory device 120.

Modifications

The inspection of the weld portion described above may be performed automatically by a robot.

Figure 25:
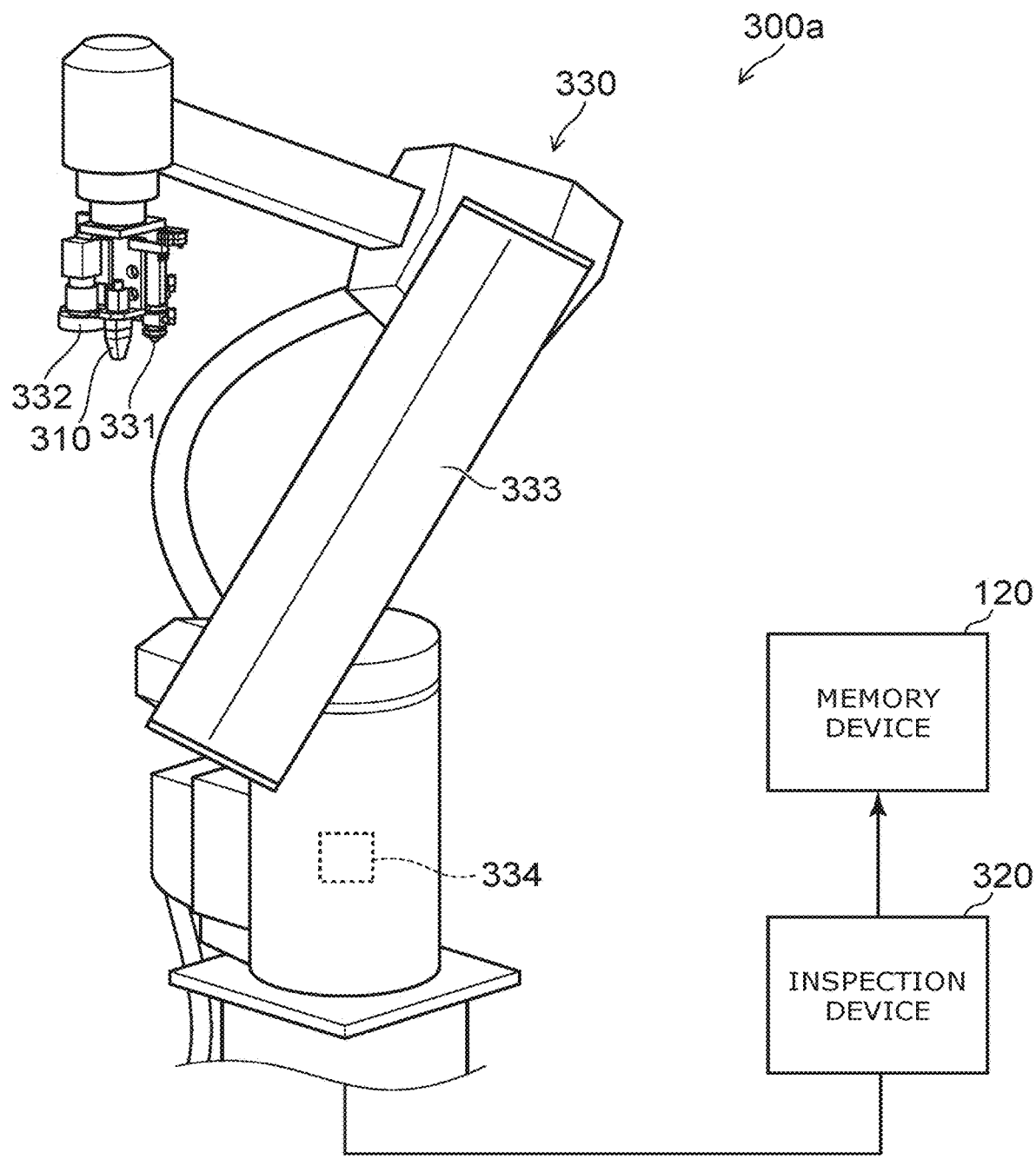
FIG. 25 is a schematic view illustrating a configuration of an inspection system according to a modification of the embodiment.

FIG. 25 is a schematic view illustrating a configuration of an inspection system according to a modification of the embodiment.

Figure 26:
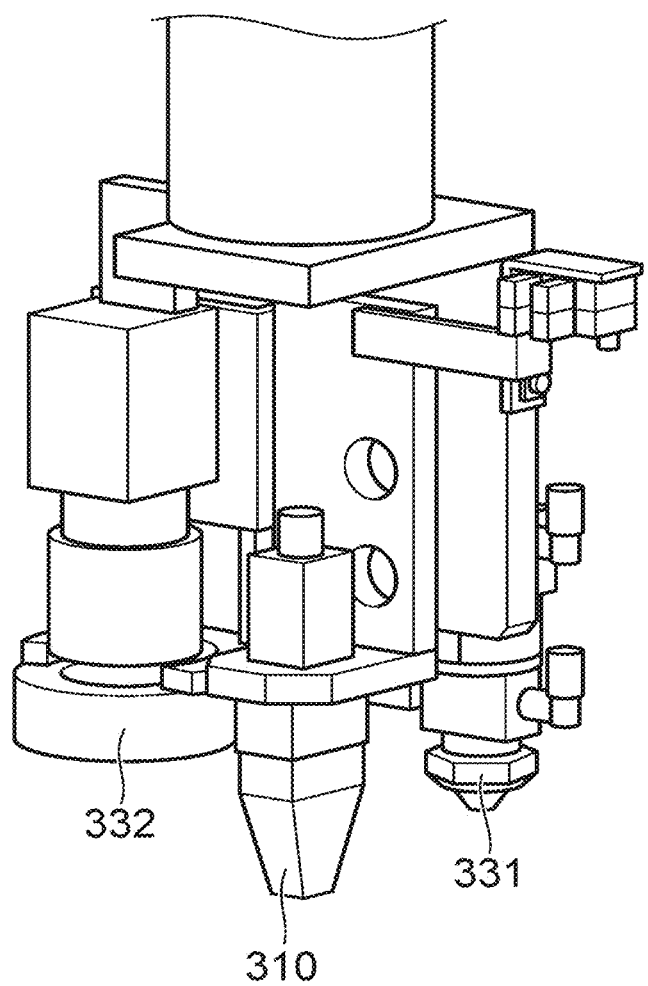
FIG. 26 is a perspective view illustrating a portion of the inspection system according to the modification of the embodiment.

FIG. 26 is a perspective view illustrating a portion of the inspection system according to the modification of the embodiment.

The inspection system 300*a* illustrated in FIG. 25 includes the inspection device 320 and a robot 330. The robot 330 includes the probe 310, an imager 331, a coater 332, an arm 333, and a control device 334.

The imager 331 acquires an image by imaging the welded member. The imager 331 extracts a weld mark from the image and detects roughly the position of the weld portion 13. The coater 332 coats a couplant onto the upper surface of the weld portion 13.

The probe 310, the imager 331, and the coater 332 are provided at the tip of the arm 333 as illustrated in FIG. 26. The arm 333 is, for example, a 6-DOF (Degree of Freedom) vertical articulated robot including multiple links and multiple rotation axes. The arm 333 includes multiple actuators (for example, motors). The multiple actuators respectively drive the multiple rotation axes. The probe 310, the imager 331, and the coater 332 can be displaced by driving the arm 333. The control device 334 controls the operations of the components of the robot 330.

Figure 27:
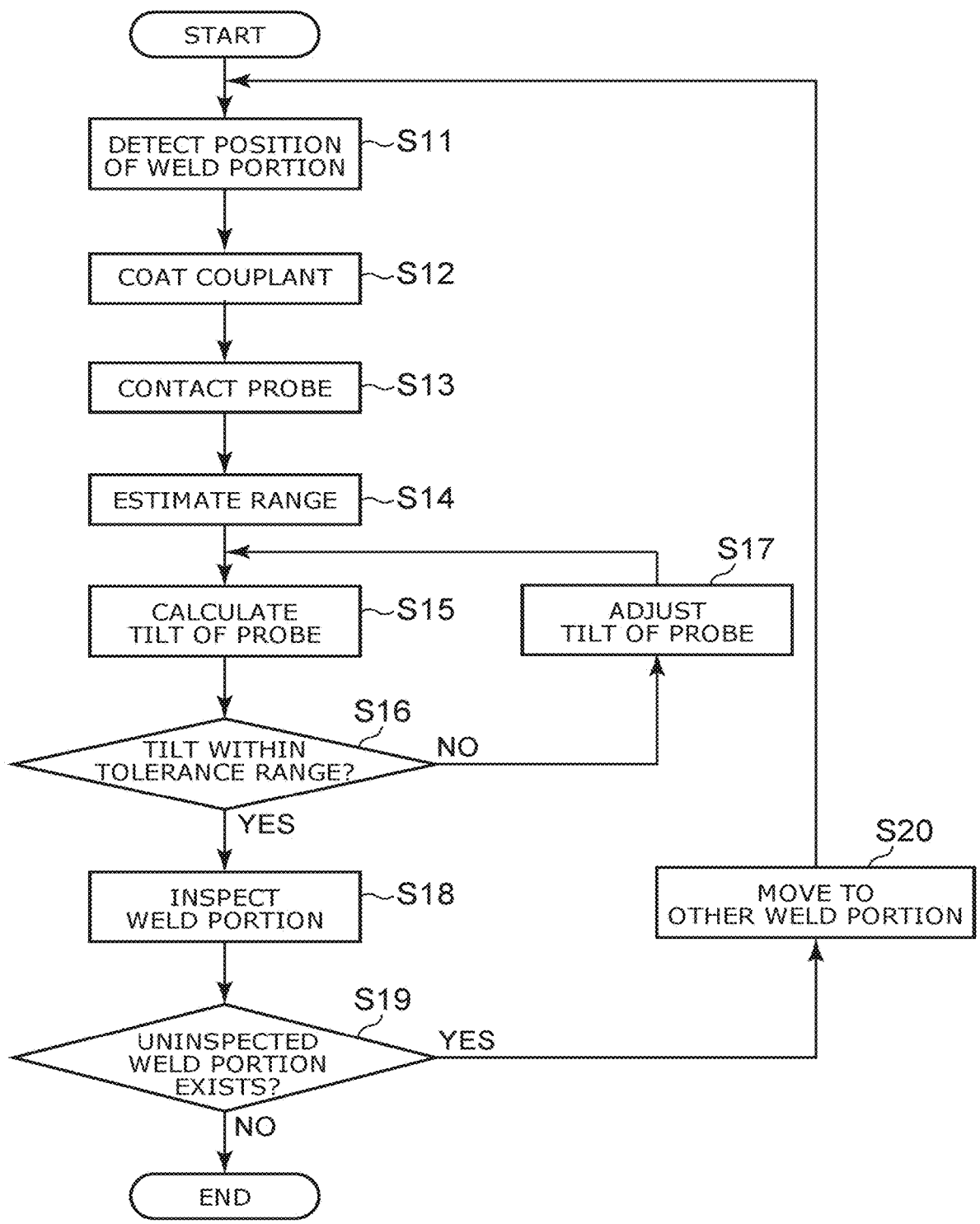
FIG. 27 is a flowchart illustrating an operation of the inspection system according to the modification of the embodiment.

FIG. 27 is a flowchart illustrating an operation of the inspection system according to the modification of the embodiment.

First, the imager 331 images the member 10 and detects the position of the weld portion 13 from the acquired image (step S11). The arm 333 moves the coater 332 to a position opposing the weld portion 13. The coater 332 coats the couplant onto the weld portion 13 (step S12). The arm 333 moves the probe 310 and causes the probe 310 to contact the weld portion 13 (step S13).

In the state in which the probe 310 contacts the weld portion 13, the ultrasonic wave is transmitted, and the reflected waves are received. The probe 310 transmits the detection result of the reflected waves to the inspection device 320. Based on the detection result, the inspection device 320 estimates the range of the weld portion 13 in the X-direction, the Y-direction, and the Z-direction (step S14). Based on the detection result of the reflected waves in the estimated range, the inspection device 320 calculates the tilt of the probe 310 (step S15). The inspection device 320 transmits the calculated tilt to the display control device 110 and stores the calculated tilt in the memory device 120.

The inspection device 320 determines whether or not the calculated tilt is within a tolerance range (step S16). When the tilt is not within the tolerance range, the control device 334 adjusts the tilt of the probe 310 by driving the arm 333 (step S17). The tilt of the probe 310 is calculated again based on the detection result of the reflected waves after adjusting the tilt. When the tilt is within the tolerance range, the inspection device 320 inspects the weld portion 13 by using the detection result of the reflected waves for which the tilt is obtained (step S18). The inspection device 320 determines whether or not an uninspected weld portion 13 exists (step S19). The inspection ends when there is no uninspected weld portion 13. When an uninspected weld portion 13 exists, the inspection device 320 drives the arm 333 and moves the probe 310, the imager 331, and the coater 332 toward another weld portion 13 (step S20). Subsequently, steps S11 to S19 are performed again.

The display control device 110 updates the display of the symbol 911 in the region 910 of the user interface 900 according to the reception of the tilt of the probe 310 calculated in step S15. The user easily can confirm, from the user interface 900, the transition of the tilt of the probe 310, whether or not the inspection is being performed within the tolerance range, etc. In such a case, for example, the user is the manager of the weld inspection.

In the example described above, the weld portion 13 that is spot-welded is inspected by the inspection system 300. The welding method is not limited to the example; a member that is welded using another method may be inspected by the inspection system 300. For example, the inspection system 300 may inspect a member that is subjected to arc welding, laser welding, or seam welding. A non-destructive inspection that uses the probe 310 is possible for members welded by these methods as well. To obtain an appropriate inspection result, it is desirable for the tilt of the probe 310 with respect to the weld portion to be small.

The content that is displayed in the setter 930, the inspection result 950, etc., is modified as appropriate according to the welding method of the inspected member. For example, for welding in a line configuration by arc welding, laser welding, or seam welding, the threshold of the width of the weld portion is input to the input field 933. In the inspection, the weld is determined to be good when the width of the weld portion calculated based on the detection result of the reflected waves is not less than a threshold. For example, the value of the average of the widths of the weld portion for each of the multiple points is displayed in the item 953. The longest width of the weld portion is displayed in the item 954. The shortest width of the weld portion is displayed in the item 955.

In the inspection system 300*a* according to the modified example, instead of the arm 333, another movable mechanism having two or more DOF may be provided. The movable mechanism includes an actuator. The probe 310 is attached to the movable mechanism. For example, the movable mechanism includes at least one selected from a 6-DOF parallel link mechanism, a 6-DOF horizontal articulated mechanism, and a 2-DOF gonio head. The control device 334 controls and drives the movable mechanism. By driving the movable mechanism, the tilt of the probe 310 changes. When the DOF of the movable mechanism is less than 6-DOF, the member 10 is preferably transported by a transport mechanism (not shown) so as to come into contact with the probe 310.

Figure 28:
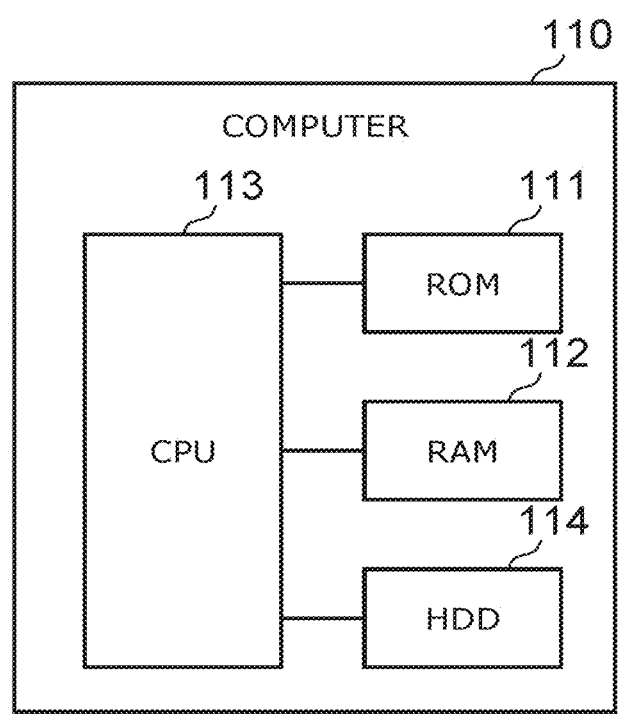
FIG. 28 is a block diagram illustrating a hardware configuration of the system.

FIG. 28 is a block diagram illustrating a hardware configuration of the system.

For example, the display control device 110 of the display control system 100 according to the embodiment is a computer and includes ROM (Read Only Memory) 111, RAM (Random Access Memory) 112, a CPU (Central Processing Unit) 113, and a HDD (Hard Disk Drive) 114.

The ROM 111 stores programs controlling the operations of the computer. The ROM 111 stores programs necessary for causing the computer to realize the processing described above.

The RAM 112 functions as a memory region where the programs stored in the ROM 111 are loaded. The CPU 113 includes a processing circuit. The CPU 113 reads a control program stored in the ROM 111 and controls the operation of the computer according to the control program. Also, the CPU 113 loads various data obtained by the operation of the computer into the RAM 112. The HDD 114 stores data necessary for reading and data obtained in the reading process. For example, the HDD 114 functions as the memory device 120 illustrated in FIG. 1.

Instead of the HDD 114, the display control device 110 may include an eMMC (embedded Multi Media Card), a SSD (Solid State Drive), a SSHD (Solid State Hybrid Drive), etc.

A hardware configuration similar to that of FIG. 28 is applicable to the inspection device 320 of the inspection system 300 as well. In the inspection control system 400, one computer may function as the display control device 110 and the inspection device 320. Or, the processing and the functions of the display control device 110 and the inspection device 320 may be realized by collaboration between more computers.

The display device 210 includes, for example, at least one of a monitor or a display. The input device 220 includes, for example, at least one of a mouse, a keyboard, a touchpad, or a microphone (audio input).

By using the display control system, the inspection control system, and the display control method according to the embodiments described above, the information that relates to the weld inspection can be displayed to the user in a more easily understandable way. Similar effects can be obtained by using a program for causing the computer to operate as the display control system or the inspection control system.

The processing of the various data recited above may be recorded in a magnetic disk (a flexible disk, a hard disk, etc.), an optical disk (CD-ROM, CD-R, CD-RW, DVD-ROM, DVD±R, DVD±RW, etc.), semiconductor memory, or another recording medium as a program that can be executed by a computer.

For example, the data that is recorded in the recording medium can be read by a computer (or an embedded system). The recording format (the storage format) of the recording medium is arbitrary. For example, the computer reads the program from the recording medium and causes a CPU to execute the instructions recited in the program based on the program. In the computer, the acquisition (or the reading) of the program may be performed via a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A display control system, comprising:
    circuitry configured to:
    acquire a tilt of a detector with respect to a weld portion, the detector including a plurality of detection elements arranged along a first arrangement direction and a second arrangement direction, the first arrangement direction and the second arrangement direction crossing each other, the tilt being calculated based on a detection result of a reflected wave obtained by transmitting an ultrasonic wave from the plurality of detection elements; and
    display a user interface, display a symbol and a tolerance range in a region included in the user interface, and update the display of the symbol in the region according to the acquiring of the tilt,
    wherein the region spreads two-dimensionally, the symbol indicates the tilt, the tolerance range is of a target value of the tilt.

2. The display control system according to claim 1, wherein the circuitry is configured to:
    accept an operation of adjusting a size of the tolerance range, and
    change the size of the tolerance range displayed in the region according to the operation.

3. The display control system according to claim 2, wherein a switcher configured to switch to an automatic adjustment of the size of the tolerance range is displayed in the user interface.

4. The display control system according to claim 3, wherein the size of the tolerance range in the automatic adjustment is calculated based on a correspondence between a previous tilt and a previous inspection result of the weld portion.

5. The display control system according to claim 1, wherein a form of the display of the symbol is changed according to a difference between the tilt and the target value or a difference between the tilt and the tolerance range.

6. The display control system according to claim 1, wherein
    a sound is output when displaying the tilt in the region, and
    the sound is changed according to a difference between the tilt and the target value or a difference between the tilt and the tolerance range.

7. The display control system according to claim 1, wherein
    the circuitry is configured to acquire an inspection result of the weld portion, and
    the inspection result is displayed in the user interface.

8. The display control system according to claim 1, wherein
    the region spreads in a first direction and a second direction, the first direction and the second direction being orthogonal to each other, and
    when the first direction is parallel to the first arrangement direction, a position in the first direction indicates an angle around the second arrangement direction in the region and a position in the second direction indicates an angle around the first arrangement direction in the region.

9. The display control system according to claim 1, wherein when the tilt cannot be acquired, the symbol is not displayed in the region or an error message is displayed in the user interface.

10. The display control system according to claim 1, wherein the detector is a probe that can be held by a hand of a human.

11. An inspection control system, comprising:
    a display control system including:
        circuitry configured to:
        acquire a tilt of a detector with respect to a weld portion, the detector including a plurality of detection elements arranged along a first arrangement direction and a second arrangement direction, the first arrangement direction and the second arrangement direction crossing each other, the tilt being calculated based on a detection result of a reflected wave obtained by transmitting an ultrasonic wave from the plurality of detection elements, and display a user interface, display a symbol and a tolerance range in a region included in the user interface, and update the display of the symbol in the region according to the acquiring of the tilt;

an inspection system including the detector, the inspection system being configured to calculate the tilt and inspect the weld portion based on the detection result; and a display device configured to display the user interface, wherein the region spreads two-dimensionally, the symbol indicates the tilt, the tolerance range is of a target value of the tilt.

12. The inspection control system according to claim 11, wherein the inspection system is configured to perform the inspecting when the symbol enters the tolerance range.

13. The inspection control system according to claim 11, wherein the inspection system is configured to compare a diameter of the weld portion to a threshold in the inspecting, and the circuitry is configured to display a setter configured to set the threshold in the user interface.

14. The inspection control system according to claim 13, wherein thicknesses of a plurality of members joined by the weld portion are inputtable in the setter, and the threshold is set automatically based on the thicknesses.

15. The inspection control system according to claim 11, wherein the inspection system further includes:

a movable mechanism including an actuator, the detector being attached to the movable mechanism, and a control device configured to drive the movable mechanism.

16. A display control method, comprising:

acquiring a tilt of a probe with respect to a weld portion, the probe including a plurality of ultrasonic sensors arranged along a first arrangement direction and a second arrangement direction, the first arrangement direction and the second arrangement direction crossing each other, the tilt being calculated based on a detection result of a reflected wave obtained by transmitting an ultrasonic wave from the plurality of ultrasonic sensors; and displaying a user interface, displaying a symbol and a tolerance range in a region included in the user interface, and updating the display of the symbol in the region according to the acquiring of the tilt, wherein the region spreads two-dimensionally, the symbol indicates the tilt, the tolerance range is of a target value of the tilt.

17. A non-transitory computer readable storage medium storing a program, the program causing a computer to:

acquire a tilt of a probe with respect to a weld portion, the probe including a plurality of ultrasonic sensors arranged along a first arrangement direction and a second arrangement direction, the first arrangement direction and the second arrangement direction crossing each other, the tilt being calculated based on a detection result of a reflected wave obtained by transmitting an ultrasonic wave from the plurality of ultrasonic sensors; and display a user interface, display a symbol and a tolerance range in a region included in the user interface, and update the display of the symbol in the region according to the acquiring of the tilt, wherein the region spreads two-dimensionally, the symbol indicates the tilt, the tolerance range is of a target value of the tilt.

18. The non-transitory computer readable storage medium according to claim 17, wherein the program causes the computer to:

accept an operation of adjusting a size of the tolerance range; and change a size of the tolerance range displayed in the region according to the operation.

19. The non-transitory computer readable storage medium according to claim 17, wherein the program causes the computer to change a form of the display of the symbol according to a difference between the tilt and the target value or a difference between the tilt and the tolerance range.

20. The non-transitory computer readable storage medium according to claim 17, wherein the program causes the computer to:

output a sound when the tilt is displayed in the region; and change the sound according to a difference between the tilt and the target value or a difference between the tilt and the tolerance range.

21. The non-transitory computer readable storage medium according to claim 17, wherein the program causes the computer to:

display the region spreading in a first direction and a second direction, the first direction and the second direction being orthogonal to each other; and display, when the first direction is along the first arrangement direction, the region to cause a position in the first direction to indicate an angle around the second arrangement direction and to cause a position in the second direction to indicate an angle around the first arrangement direction.

* * * * *